(12) United States Patent
Sato

(10) Patent No.: US 8,689,952 B2
(45) Date of Patent: Apr. 8, 2014

(54) DAMPER

(75) Inventor: Toshihisa Sato, Takatsuki (JP)

(73) Assignee: Nifco Inc., Yokohama-shi (JP)

( * ) Notice: Subject to any disclaimer, the term of this patent is extended or adjusted under 35 U.S.C. 154(b) by 50 days.

(21) Appl. No.: 13/522,190

(22) PCT Filed: Jan. 11, 2011

(86) PCT No.: PCT/JP2011/050294
§ 371 (c)(1),
(2), (4) Date: Aug. 6, 2012

(87) PCT Pub. No.: WO2011/089952
PCT Pub. Date: Jul. 28, 2011

(65) Prior Publication Data
US 2012/0298460 A1    Nov. 29, 2012

(30) Foreign Application Priority Data

Jan. 25, 2010 (JP) .................................. 2010-013287
Jul. 6, 2010 (JP) .................................. 2010-154029

(51) Int. Cl.
*F16F 9/14* (2006.01)
(52) U.S. Cl.
USPC .......................................... 188/307; 188/296

(58) Field of Classification Search
USPC ....................... 188/290, 292, 296, 307; 16/82
See application file for complete search history.

(56) References Cited

U.S. PATENT DOCUMENTS

| | | | | |
|---|---|---|---|---|
| 5,449,054 A | * | 9/1995 | Wiese et al. | 188/296 |
| 6,173,822 B1 | * | 1/2001 | Korb et al. | 188/307 |
| 2011/0226573 A1 | * | 9/2011 | Kojima et al. | 188/307 |

FOREIGN PATENT DOCUMENTS

| | | |
|---|---|---|
| JP | H08-296687 | 11/1996 |
| JP | 2006-153066 | 6/2006 |
| JP | 2008-038933 | 2/2008 |
| JP | 2008-215578 | 9/2008 |
| JP | 4181831 | 9/2008 |

* cited by examiner

*Primary Examiner* — Christopher Schwartz
(74) *Attorney, Agent, or Firm* — Manabu Kanesaka

(57) ABSTRACT

A damper includes a housing, a cap, a rotor portion, and blade portions projecting from the rotor portion. The blade portions include deformation portions in which the blade portions expand the diameter in one rotational direction in response to a resistance received from a viscous fluid, and in which the blade portions reduce the diameter in the other rotational direction. The blade portions engage a ring member provided on an inner circumference of the housing at a time of diameter expansion, and drag the ring member around.

6 Claims, 32 Drawing Sheets

DAMPER

FIELD OF TECHNOLOGY

The present invention relates to a rotary damper using a viscous fluid, and at a time of diameter expansion, blade portions engage with a ring member provided on an inner circumference of a housing, and drag the ring member around. Due to synergistic effects of dragging the ring member with a rotor portion and the changes of an outer diameter of the rotor portion, a change of a generated torque by a rotational direction of the rotor portion can be widely set.

BACKGROUND ART

Conventionally, there is well-known a damper provided with blade portions extending in a spiral manner in the first rotor portion (see paragraph [0014] and FIG. 4 of Patent Document 1).

When the aforementioned conventional first rotor portion is rotated in one rotational direction, for example, clockwise, end portions of the blade portions separate from an inner circumferential surface of the housing so as to become a low torque (see paragraphs [0020] and [0021], and FIGS. 4 and 7 of the Patent Document 1).

On the other hand, when the aforementioned conventional first rotor portion is rotated in the other rotational direction, for example, counterclockwise, the end portions of the blade portions abut against the inner circumferential surface of the housing, and a silicon oil only flows along an orifice so as to become a high torque (see paragraphs [0022] and [0023], and FIGS. 4 and 7 of the Patent Document 1).

Also, conventionally, there is well-known a damper provided with plural intervening blade portions extending in a radial manner in the rotor portion, and forming a constricted portion on a base portion side of the blade portions so as to narrow a width. Accordingly, the damper facilitates an elastic deformation of the blade portions in response to a resistance received from the viscous fluid, and also changes a clearance in a position wherein a circular surface of the blade portions and an inner circumferential wall of the housing come the most close (see paragraphs [0030] and [0046], and FIGS. 1 and 6 of the Patent Document 1).

PRIOR ART DOCUMENT

Patent Document

Patent Document 1: Japanese Patent Publication No. H08-296687
Patent Document 2: Japanese Patent No. 4181831

SUMMARY OF THE INVENTION

Problems to be Solved by the Invention

In the damper described in the aforementioned conventional Patent Document 1, however, a generated torque has been changed only by simply changing an outer diameter of the first rotor portion so as to have a problem that an amount of change of the torque is relatively low.

Also, in the damper described in the aforementioned conventional Patent Document 2, as is the case with the damper described in the conventional Patent Document 1, the generated torque also has been changed only by simply changing the outer diameter of the rotor portion so as to have the problem that the amount of change of the torque is relatively low.

Therefore, the present invention is made in view of the problem in which the aforementioned conventional technology has, and an object of the present invention is that at the time of diameter expansion, the blade portions engage with the ring member provided on the inner circumference of the housing, and drag the ring member around, so that due to the synergistic effects of dragging the ring member around with the rotor portion and the changes of the outer diameter of the rotor portion, the change of the generated torque by the rotational direction of the rotor portion can be widely set.

Means for Solving the Problems

The present invention is made in order to achieve the aforementioned object, and the present invention has the following characteristics.

First, a damper comprises the following structure.
(1) Housing
A housing forms an approximately cylinder shape, and is filled with a viscous fluid.
(2) Cap
A cap becomes a lid of the housing.
(3) Rotor Portion
A rotor portion is supported axially rotatably inside the housing.
(4) Blade Portion
A blade portion projects from the rotor portion.

Secondly, the blade portion comprises a deformation portion wherein the blade portion expands the diameter in one rotational direction in response to a resistance received from the viscous fluid, and wherein the blade portion reduces the diameter in the other rotational direction.

Thirdly, the blade portion engages with a ring member provided on an inner circumference of the housing at a time of diameter expansion, and drags the ring member around.

The present invention may comprise the following characteristic.

In the housing or the cap, there is provided a braking field (A) wherein a gap in an axial direction of the rotor portion becomes small at the time of diameter expansion of the blade portion. In that case, by providing the braking field wherein the gap in the axial direction of the rotor portion becomes small at the time of diameter expansion of the blade portion, the rotor portion drags the ring member, and in addition to a change of an outer diameter of the rotor portion, due to a synergistic effect of wideness and narrowness of the gap inside the housing, the change of a generated torque by the rotational direction of the rotor portion can be widely set.

The present invention may comprise the following characteristic.

The blade portion has a spiral shape. In that case, by making the blade portion in the spiral shape, the outer diameter thereof can be changed by the rotational direction of the rotor portion.

The present invention may comprise the following characteristic.

In the blade portion, there are provided engaging portions engaging with the ring member at least in two portions. In that case, by providing the engaging portions engaging with the ring member at least in two portions in the blade portion, an idle running time until the engaging portions engage with the ring member, can be shortened.

The present invention may comprise the following characteristic.

In an inner circumferential portion of the ring member wherein a locking portion of the ring member is provided, there is provided a wall in a thickness direction. In that case, the wall in the thickness direction of the ring member is provided so as to not only facilitate a visual distinction of a difference in the front and back of the ring member at an assembly time, but also to disable an assembly, or to be capable of making the assembly difficult because the wall interferes in the rotor portion and the like.

The present invention may comprise the following characteristic.

In the inner circumferential portion of the ring member, there is provided a hole in the wall in the thickness direction. In that case, by providing the hole in the wall in the thickness direction of the ring member, even in a case wherein there is an air inside the housing, at a rotation time of the ring member, the air enters into the hole so as to be capable of preventing a surface of the ring member from being covered with the air. Consequently, not only a decline in the torque due to the air can be prevented, but also producing a sound due to the air can be prevented.

Effect of the Invention

Since the present invention is structured as mentioned above, at the time of diameter expansion, the blade portion engages with the ring member provided on the inner circumference of the housing, and drags the ring member, so that due to the synergistic effects of dragging the ring member the rotor portion and change of the outer diameter of the rotor portion, the change of the generated torque by the rotational direction of the rotor portion can be widely set.

Figure 1:
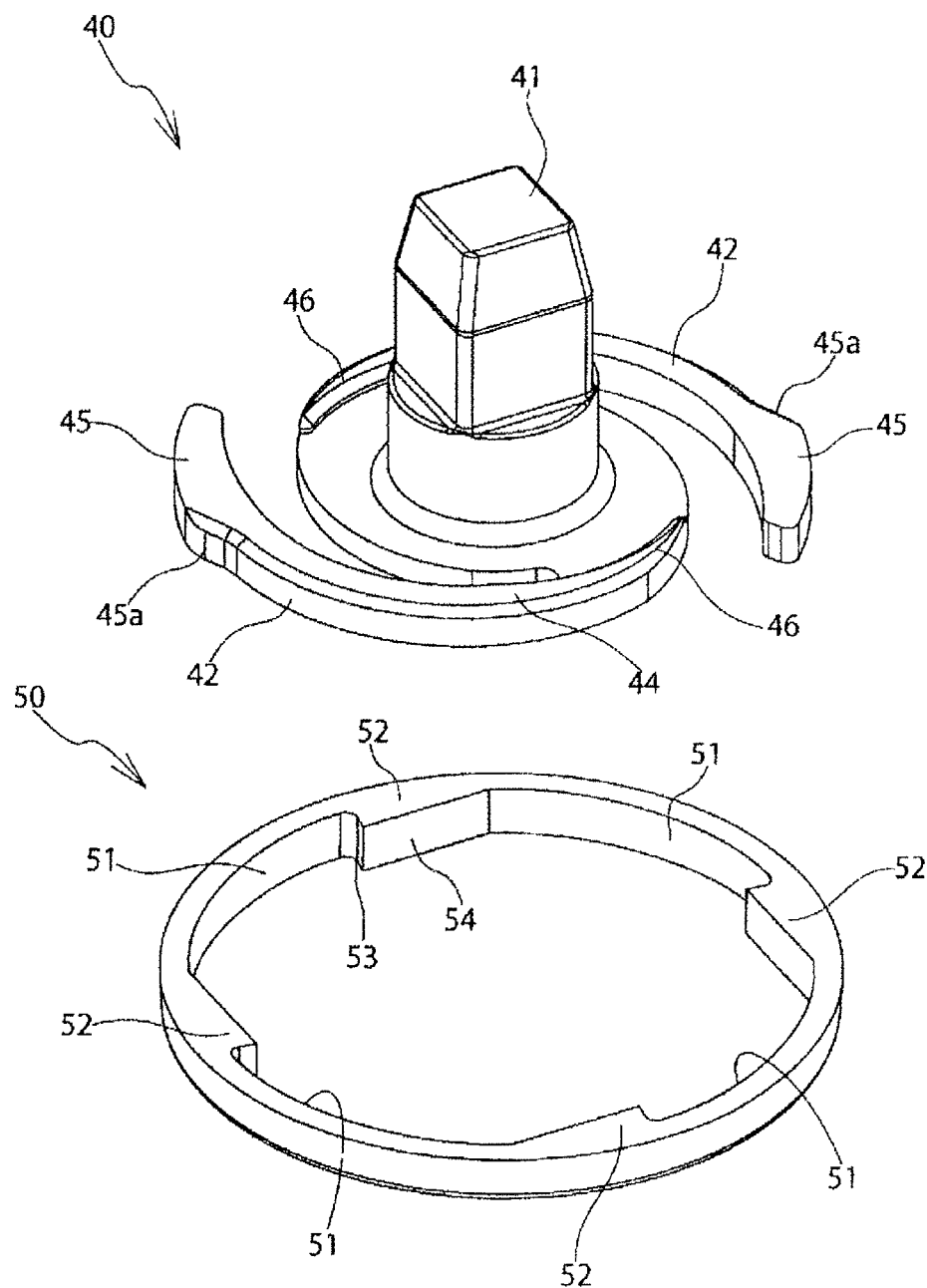
FIG. 1 is an exploded perspective view of a rotor portion and a ring member in the first embodiment of the present invention.

BEST MODES OF CARRYING OUT THE INVENTION (First Embodiment)
(Damper 10)

In FIGS. 1 to 4, the reference numeral 10 represents a damper, and the damper 10 is rotary type. Although it is not shown in the figures, inside the damper 10 is filled with a viscous fluid such as silicon oil and the like for resistance.

As shown in FIGS. 1 to 4, the damper 10 roughly comprises the following parts.

Incidentally, the following (1) to (6) will be described later.
(1) Housing 20
(2) Cap 30
(3) Rotor portion 40
(4) Ring member 50
(5) Seal member 60
(6) Gear 70

Incidentally, parts of the damper 10 are not limited to the aforementioned (1) to (6).

(Housing 20)

As shown in FIGS. 2, 6 to 9, and 28, the housing 20 forms an approximately cylinder shape, and the viscous fluid (not shown in the figures) is filled. The housing 20 is integrally molded by thermoplastic resin such as, for example, PC (polycarbonate) and the like which have an appropriate amount of elasticity and rigidity.

Specifically, as shown in FIGS. 2, 6 to 9, and 28, the housing 20 roughly comprises the following respective parts.

Incidentally, the following (1) and (2) will be described later.

(1) Outer circumferential wall 80
(2) Bottom wall 90

Incidentally, each portion of the housing 20 is not limited to the aforementioned (1) and (2).

(Cap 30)

As shown in FIGS. 2, 10 to 13, and 28, the cap 30 becomes a lid of the housing 20. The cap 30 is integrally molded by the thermoplastic resin such as, for example, PC (polycarbonate) and the like which have the appropriate amount of elasticity and rigidity.

Specifically, as shown in FIGS. 10 to 13, and 28, the cap 30 roughly comprises the following respective portions.

Incidentally, the following (1) and (2) will be described later.

(1) Upper wall 100
(2) Outer edge portion 110

Incidentally, each portion of the cap 30 is not limited to the aforementioned (1) and (2).

(Rotor Portion 40)

As shown in FIGS. 1, and 14 to 18, the rotor portion 40 is supported axially rotatably inside the housing 20. The rotor portion 40 is integrally molded by the thermoplastic resin having the appropriate amount of elasticity and rigidity.

Specifically, as shown in FIGS. 1, and 14 to 18, the rotor portion 40 roughly comprises the following respective portions.

Incidentally, the following (1) to (6) will be described later.

(1) Shaft portion 41
(2) Blade portions 42
(3) Axis hole 43
(4) Deformation portions 44
(5) Engaging portions 45
(6) Ribs 46

Incidentally, each portion of the rotor portion 40 is not limited to the aforementioned (1) to (6).

(Ring Member 50)

As shown in FIGS. 1, and 19 to 24, the ring member 50 is rotatably housed inside the housing 20; positioned between the later-mentioned blade portions 42 of the rotor portion 40 and an inner circumferential surface 81 of the later-mentioned outer circumferential wall 80 of the housing 20; engages with the blade portions 42 at a time of diameter expansion of the blade portions 42; and integrally rotates with the blade portions 42. The ring member 50 is integrally molded by the thermoplastic resin having the appropriate amount of rigidity.

Specifically, the ring member 50 is formed in a doughnut shape, and an outer circumference thereof is set approximately equal to the inner circumferential surface 81 of the outer circumferential wall 80.

Figure 19:
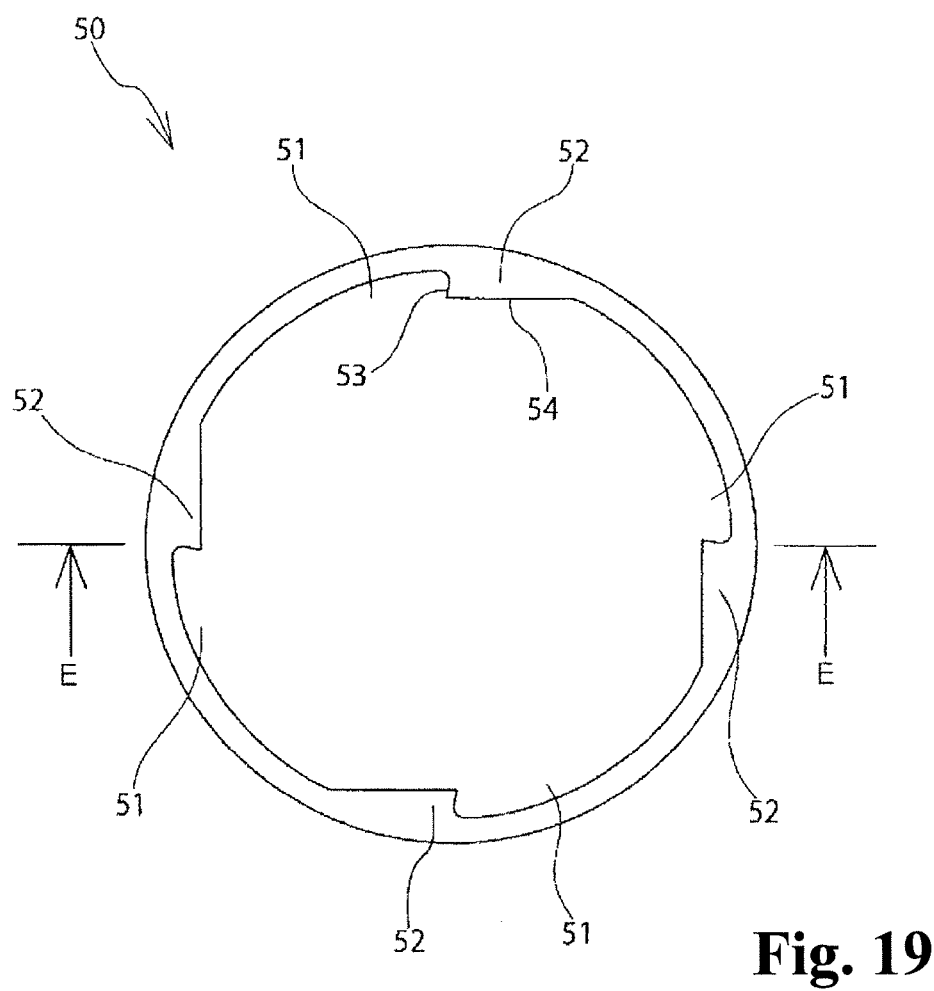
FIG. 19 is a plan view of the ring member in the first embodiment of the present invention.
Figure 20:
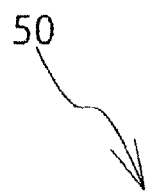
FIG. 20 is a front view of the ring member.
Figure 20:
Figure 21:
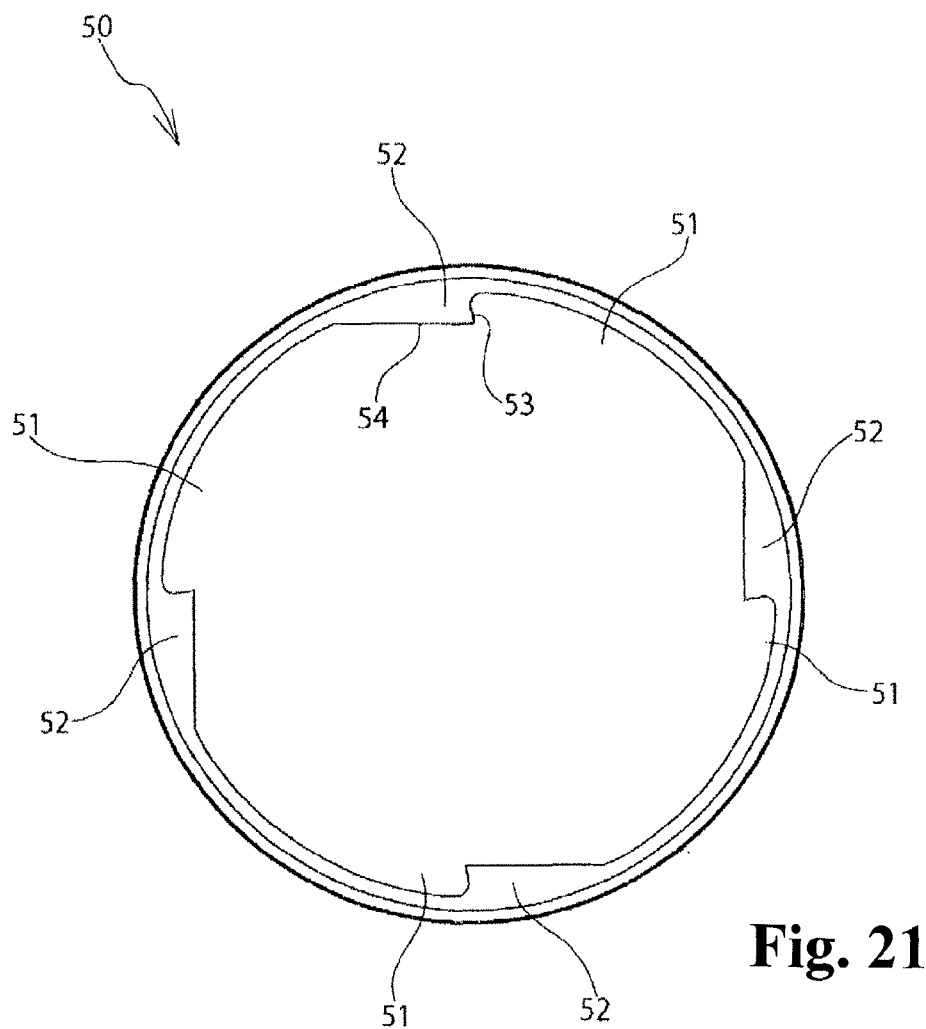
FIG. 21 is a bottom view of the ring member.
Figure 22:
FIG. 22 is a cross-sectional view taken along a line E to E in FIG. 19.
Figure 22:
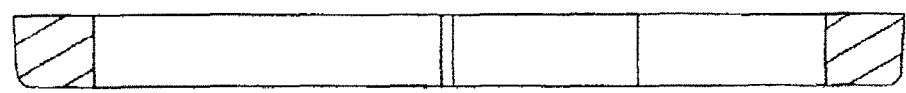
Figure 23:
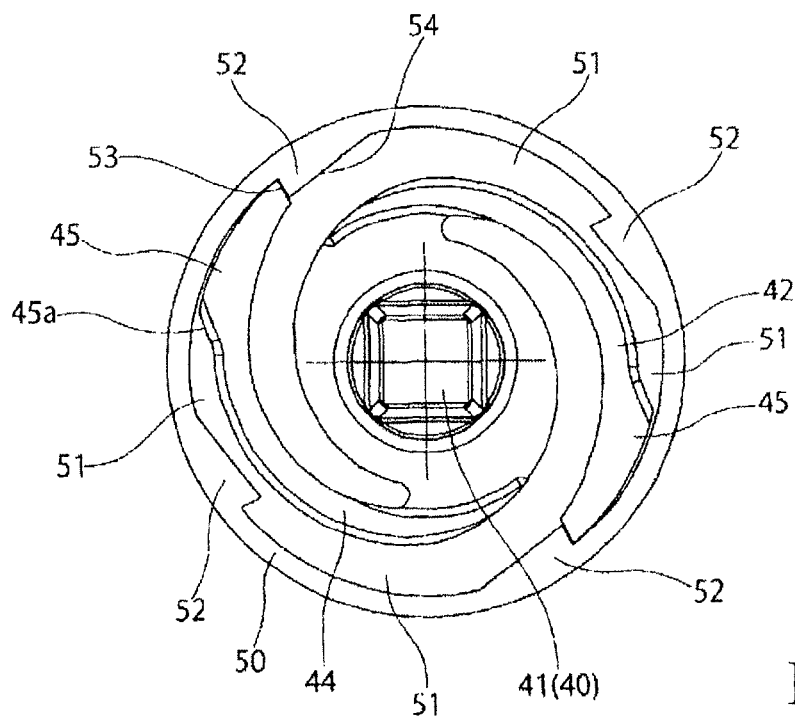
FIG. 23 is a plan view for explaining an engagement state between the rotor portion and the ring member at a time of diameter expansion.

Also, as shown in FIGS. 1, 19, and 23, the ring member 50 roughly comprises the following respective portion.

Incidentally, each portion of the ring member 50 is not limited to the following (1) and (2).

(1) Locking Portions 51

As shown in FIGS. 1, 19, and 23, the locking portions 51 are formed on an inner circumference of the ring member 50, and at the time of diameter expansion of the later-mentioned blade portions 42, engage with the later-mentioned engaging portions 45 provided in the blade portions 42, and integrally rotate the blade portions 42 and the ring member 50.

Specifically, the locking portions 51 are formed on the inner circumference of the ring member 50 with a plurality of pieces, for example, with four pieces at an interval of 90 degrees, and are formed in a concave shape.

Incidentally, although the locking portions 51 are formed in the concave shape, the shape of the locking portions 51 is not limited to that, and may be formed in a convex shape. Also, as for the number of the locking portions 51, four pieces are illustrated as an example. However, the number of the locking portions 51 is not limited to that, and the locking portions 51 may be formed with a single piece, two pieces, three pieces, or five pieces or above.

(2) Guide Portions 52

As shown in FIGS. 1, 19, and 23, guide portions 52 are formed between adjoining locking portions 51, and are formed with four pieces as in the same number of the locking portions 51.

Incidentally, although the guide portions 52 are formed with four pieces as in the same number of the locking portions 51, the number of the guide portions 52 is not limited to that, and the guide portions 52 may be formed with a single piece, two pieces, three pieces, or five pieces or above as in the same number of the locking portions 51.

Specifically, the guide portions 52 protrude from the inner circumference of the ring member 50, and a plane surface of the guide portions 52 is formed in an approximately right triangle. The guide portions 52 comprise a locking surface 53 facing the locking portions 51, and wherein end portions of the blade portions 42 bump into; and an inclined surface 54 adjoining the locking surface 53, and inclining downwardly toward the concave-shaped locking portions 51.

(Seal Member 60)

Figure 2:
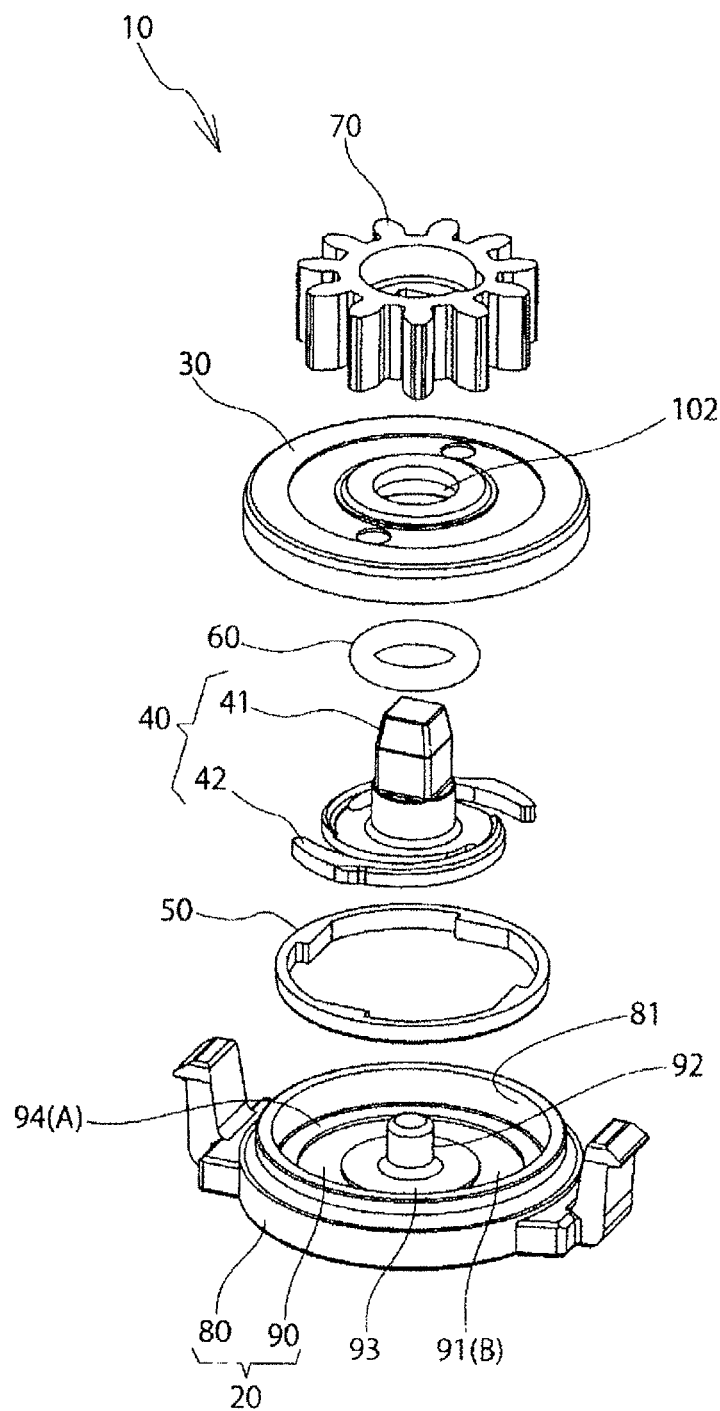
FIG. 2 is an exploded perspective view of a damper including a gear in the first embodiment of the present invention.
Figure 3:
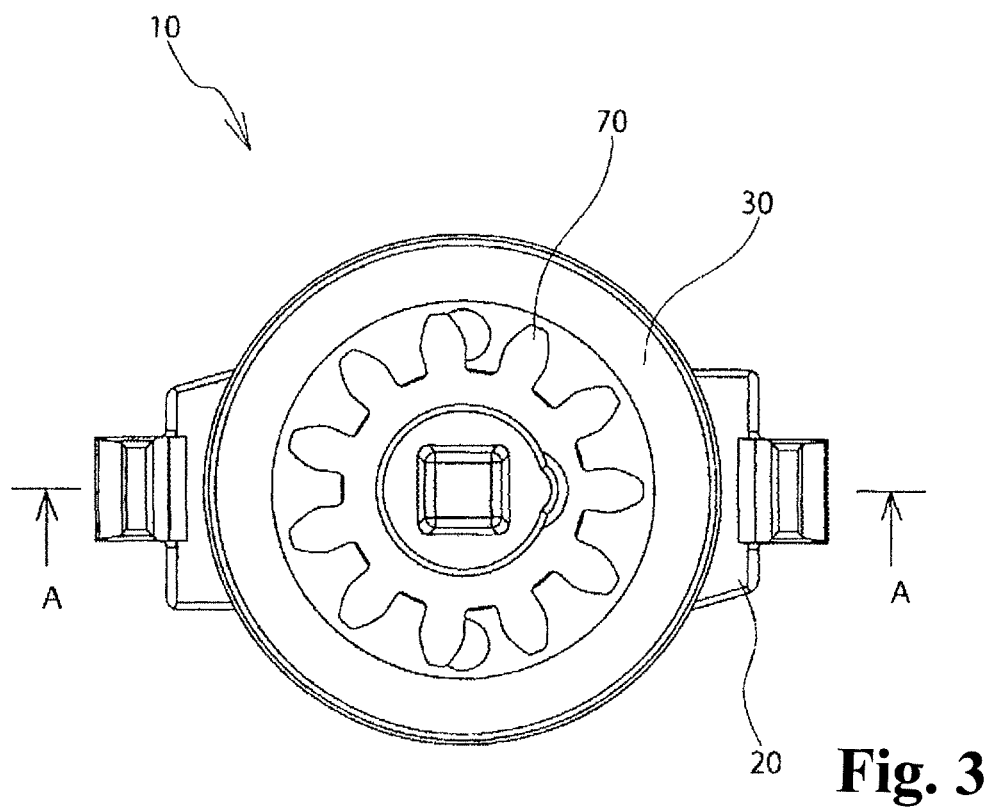
FIG. 3 is a plan view of the damper in a state wherein the gear is attached.
Figure 4:
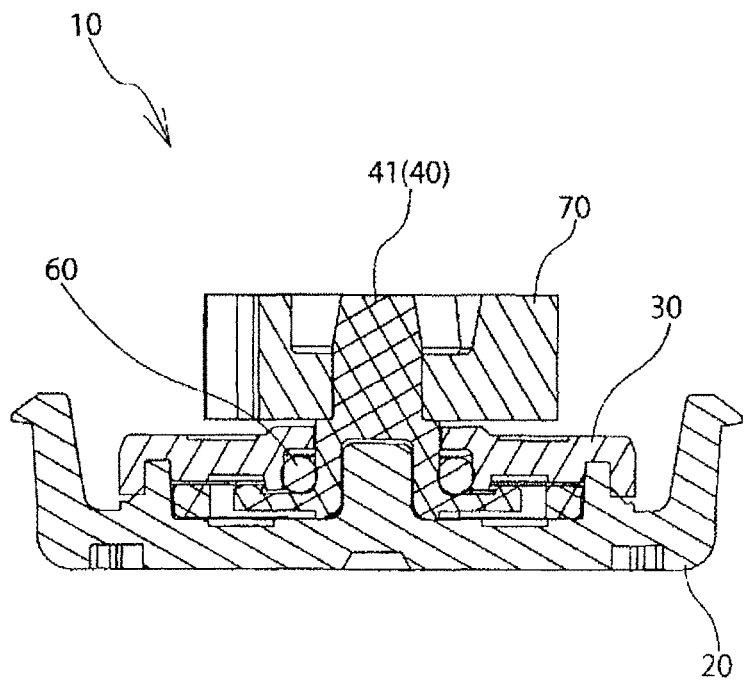
FIG. 4 is a cross-sectional view taken along a line A to A in FIG. 3.
Figure 5:
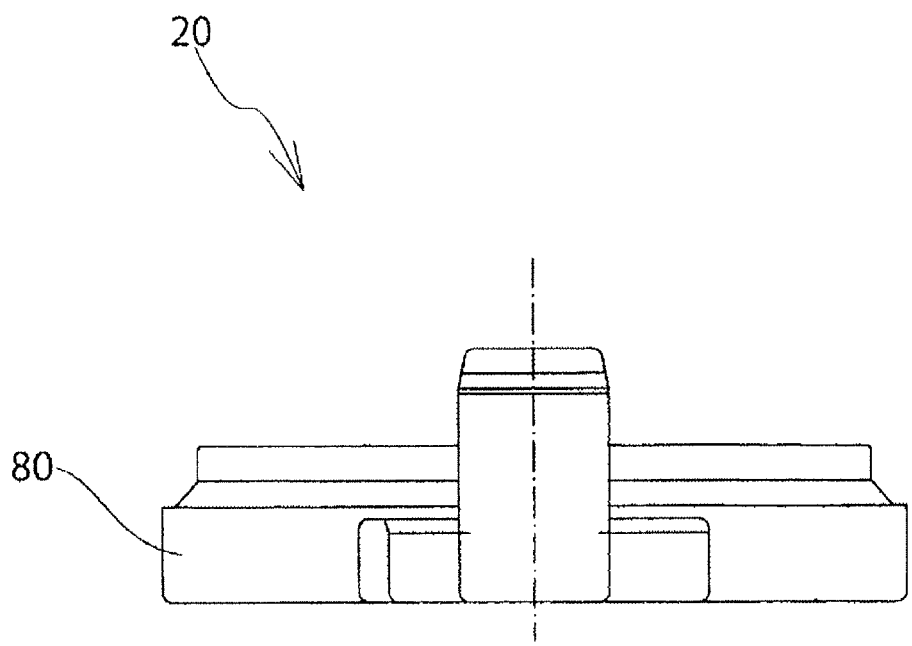
FIG. 5 is a front view of a housing in the first embodiment of the present invention.
Figure 6:
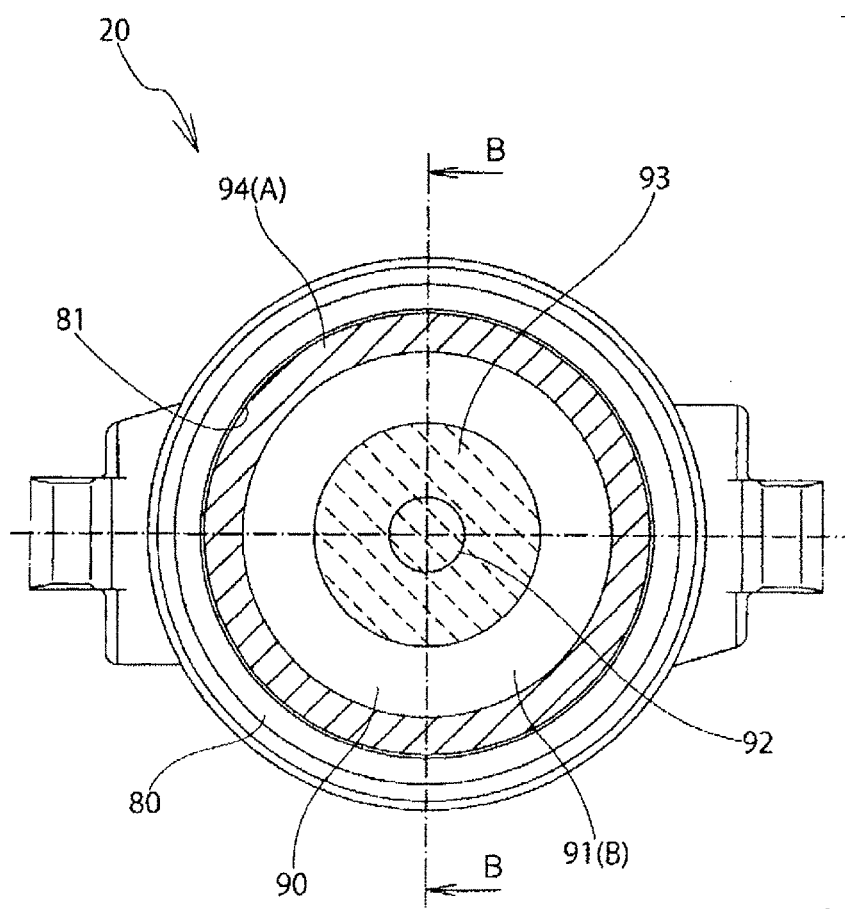
FIG. 6 is a plan view of the housing.
Figure 7:
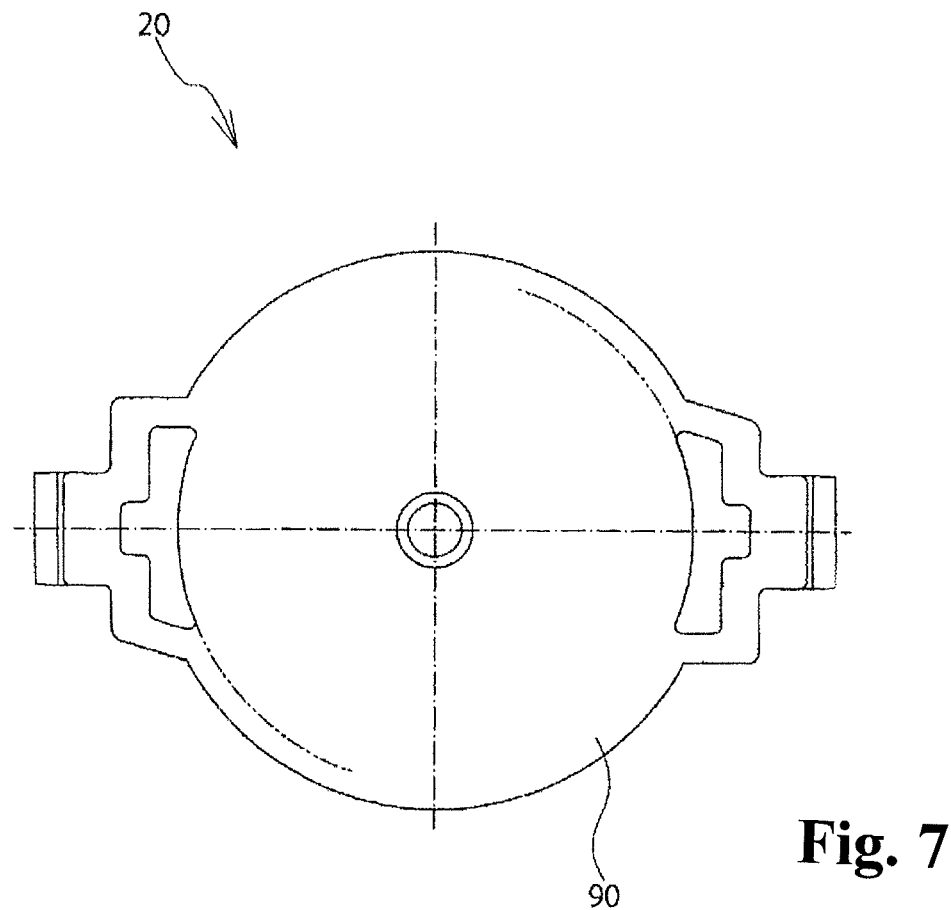
FIG. 7 is a bottom view of the housing.
Figure 8:
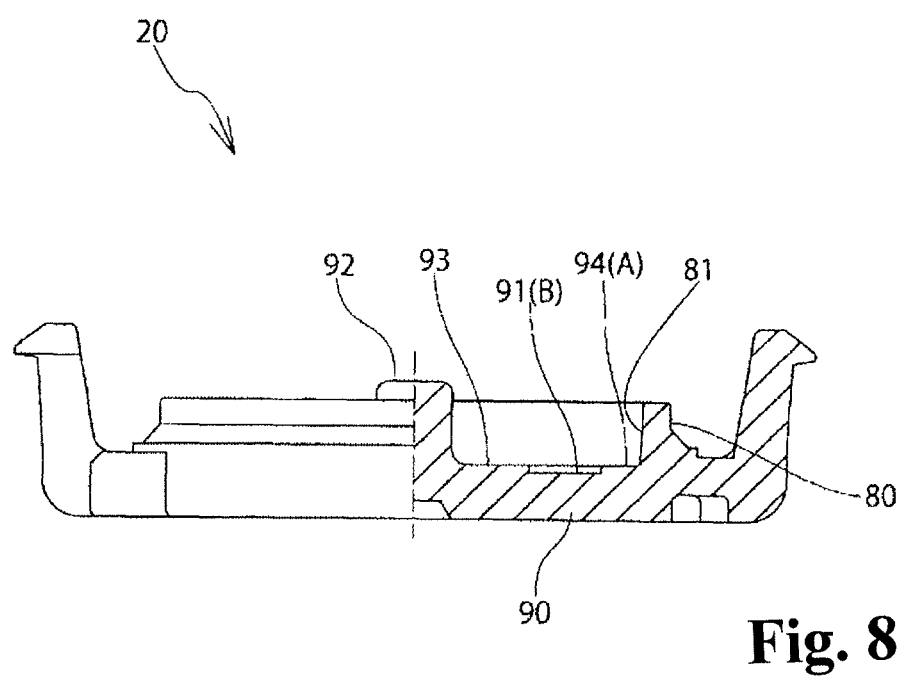
FIG. 8 is a side view of the housing whose right half is shown in a cross-sectional surface.
Figure 9:
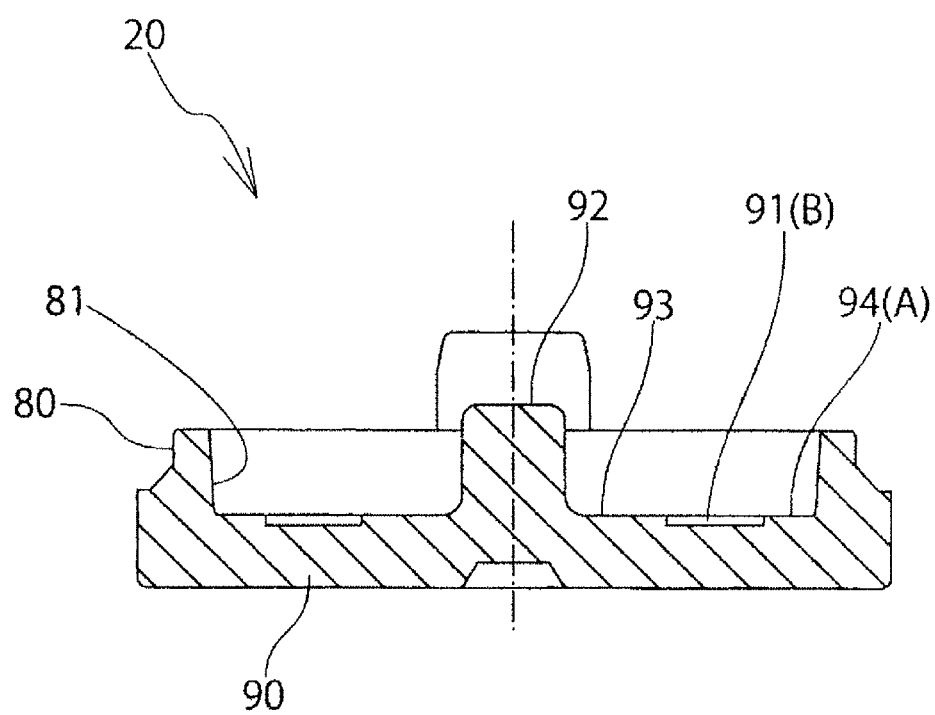
FIG. 9 is a cross-sectional view taken along a line B to B in FIG. 6.
Figure 10:
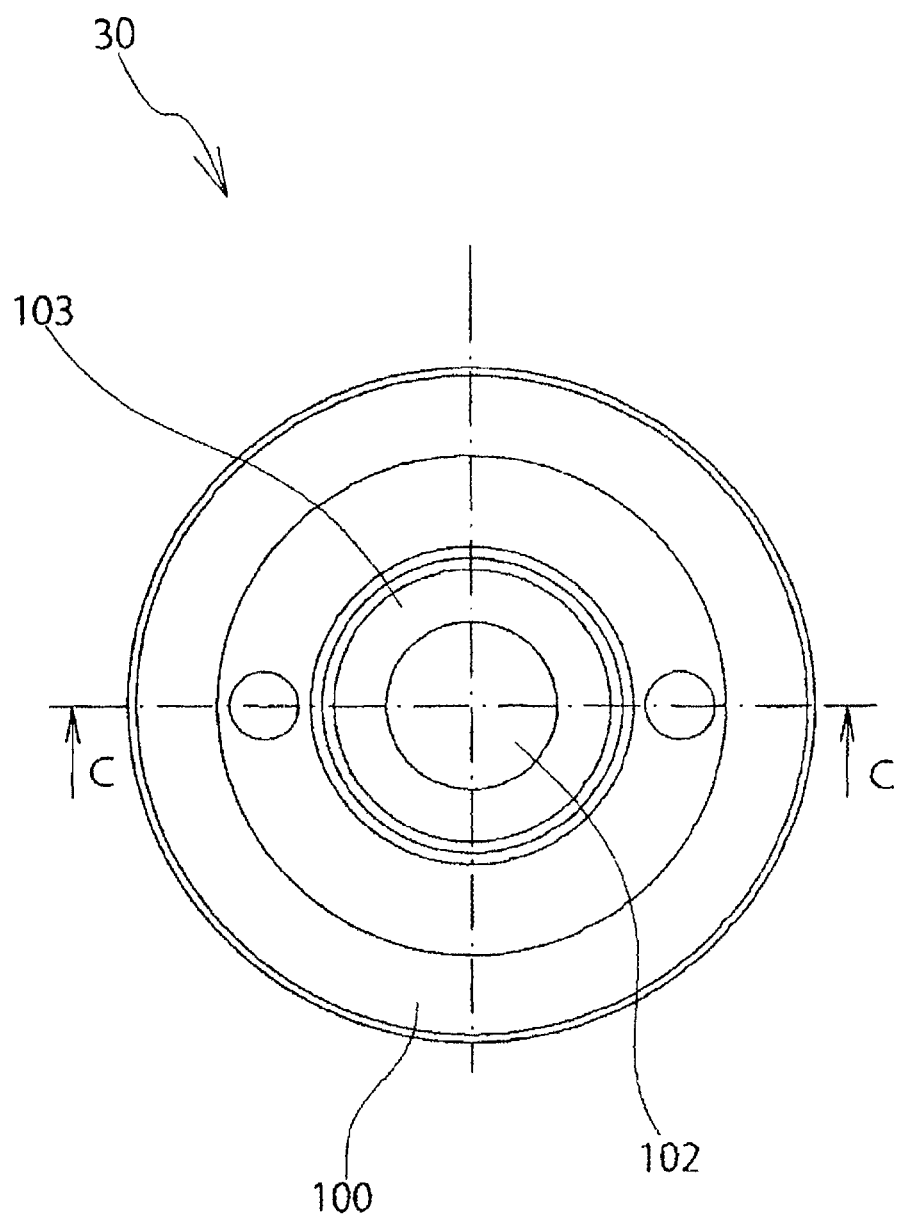
FIG. 10 is a plan view of a cap in the first embodiment of the present invention.
Figure 11:
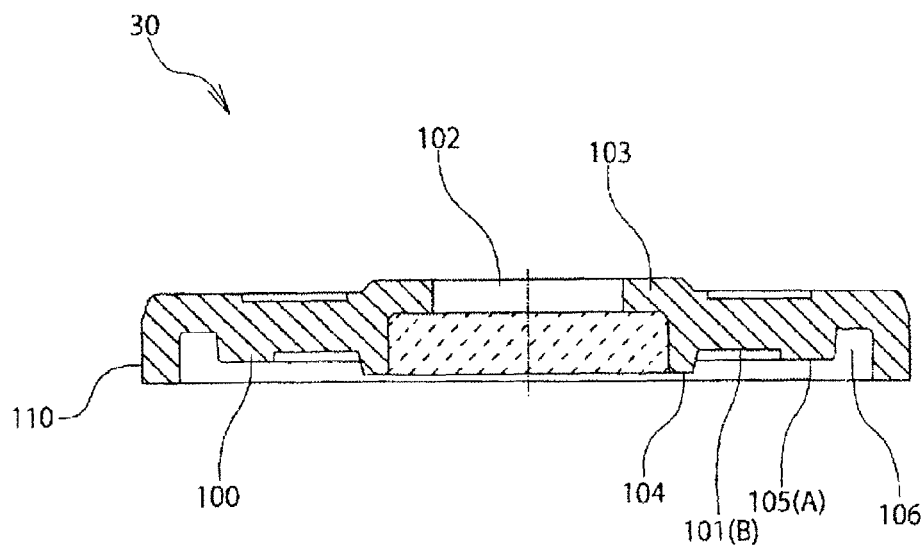
FIG. 11 is a vertical cross-sectional view of the cap.
Figure 12:
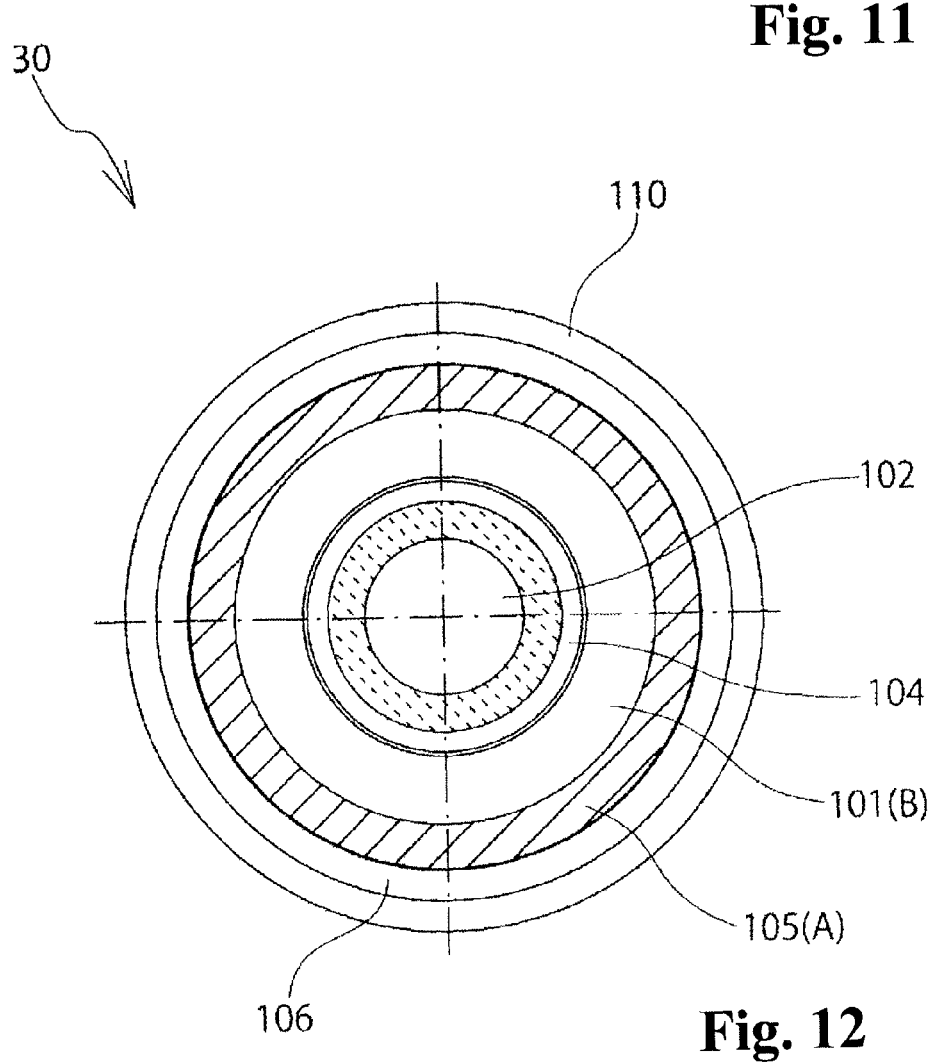
FIG. 12 is a bottom view of the cap.
Figure 13:
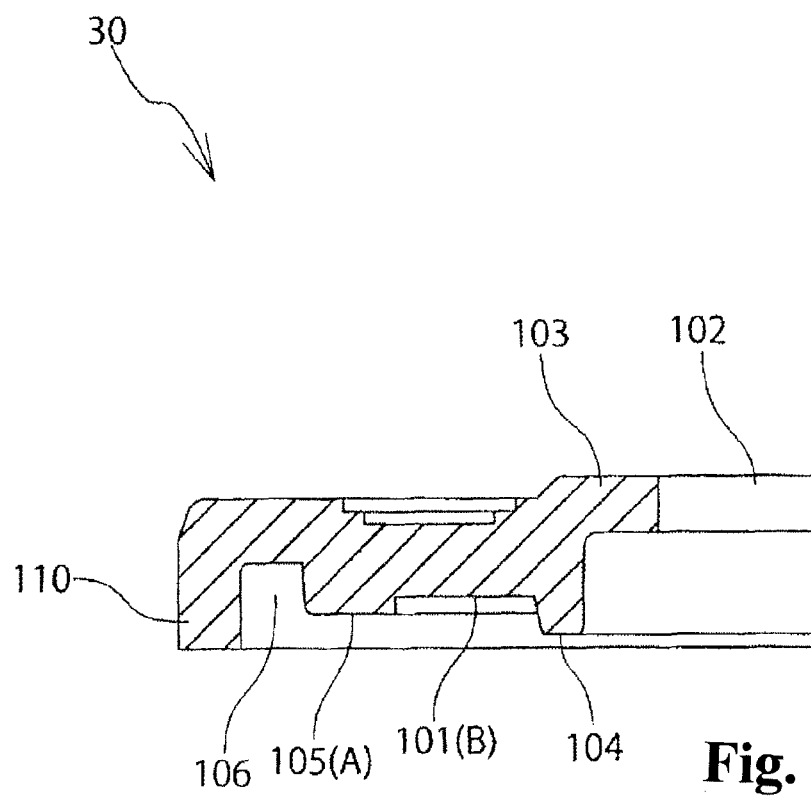
FIG. 13 is a cross-sectional view taken along a line C to C in FIG. 10.

As shown in FIGS. 2 and 4, the seal member 60 is structured by an O-ring, and is fitted into the later-mentioned shaft portion 41 of the rotor portion 40. The seal member 60 seals between an outer circumference of the shaft portion 41 and the later-mentioned through-hole 102 of the cap 30.

(Gear 70)

As shown in FIGS. 2 and 4, the gear 70 is fixed to an end portion of the after-mentioned shaft portion 41 of the rotor portion 40 protruding outside the housing 20 from the cap 30.

(Shaft Portion 41)

As shown in FIGS. 1, 14 to 16, and 18, the shaft portion 41 is supported by an axis on the later-mentioned fixed axis 92 inside the housing 20, and also protrudes outside the housing 20 through the later-mentioned through-hole 102 of the cap 30. A cross-sectional surface of the end portion of the shaft portion 41 is formed in a non-circular shape, for example, a square shape.

(Blade Portions 42)

As shown in FIGS. 1, and 14 to 18, the blade portions 42 project from the rotor portion 40. The blade portions 42 are formed with two pieces, and extend in a spiral manner.

Figure 14:
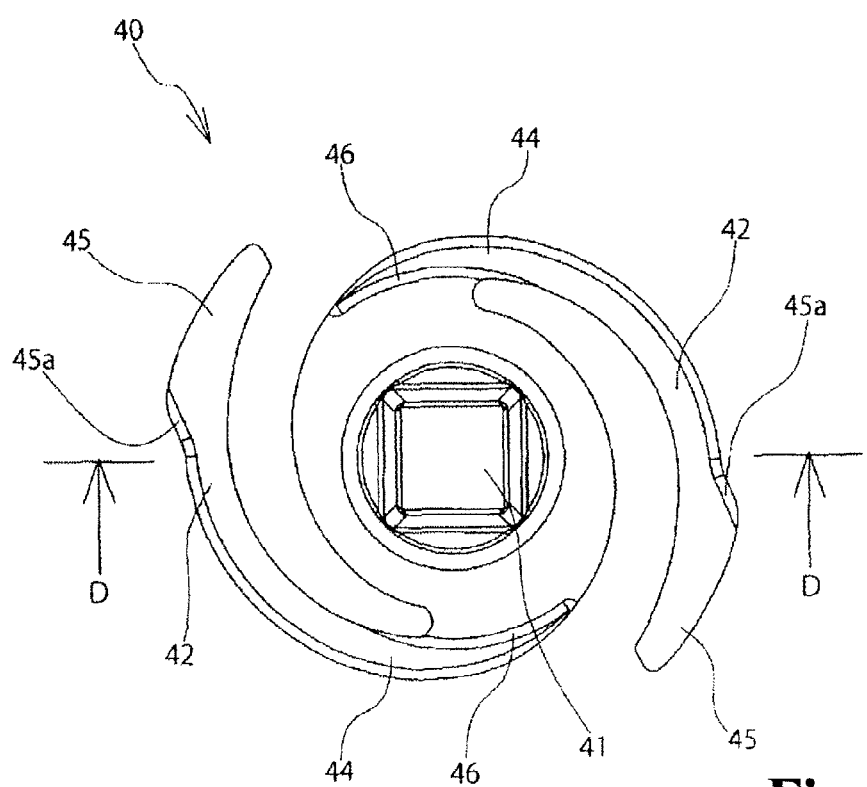
FIG. 14 is a plan view of the rotor portion in the first embodiment of the present invention.
Figure 15:
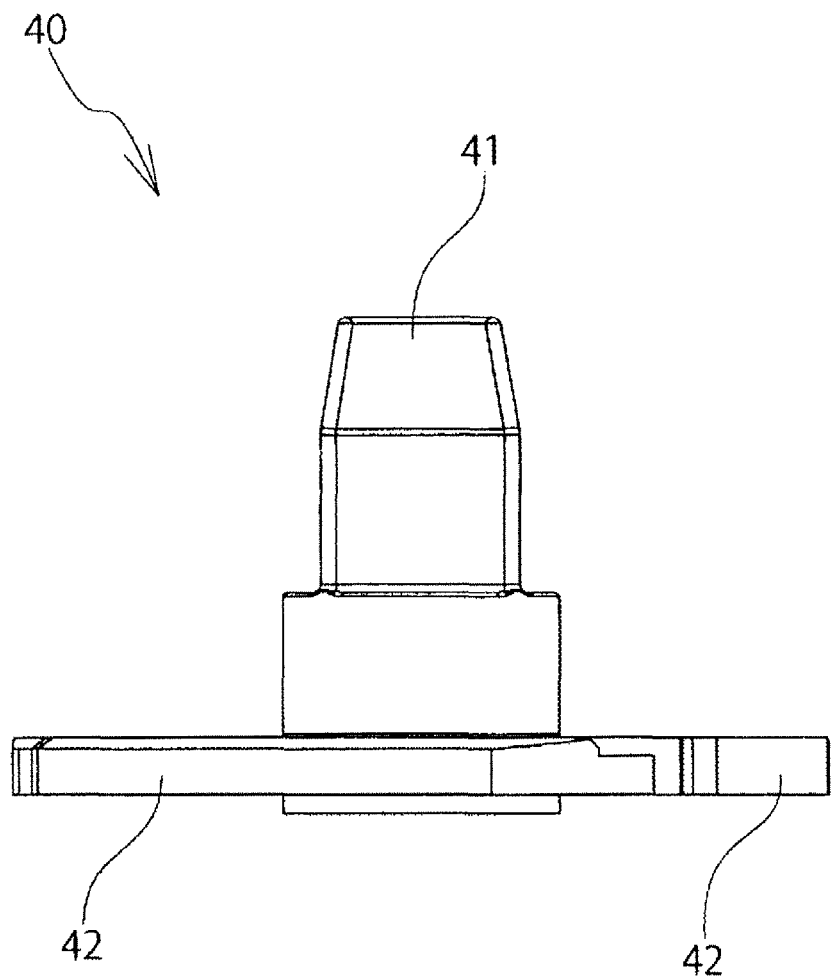
FIG. 15 is a front view of the rotor portion.
Figure 16:
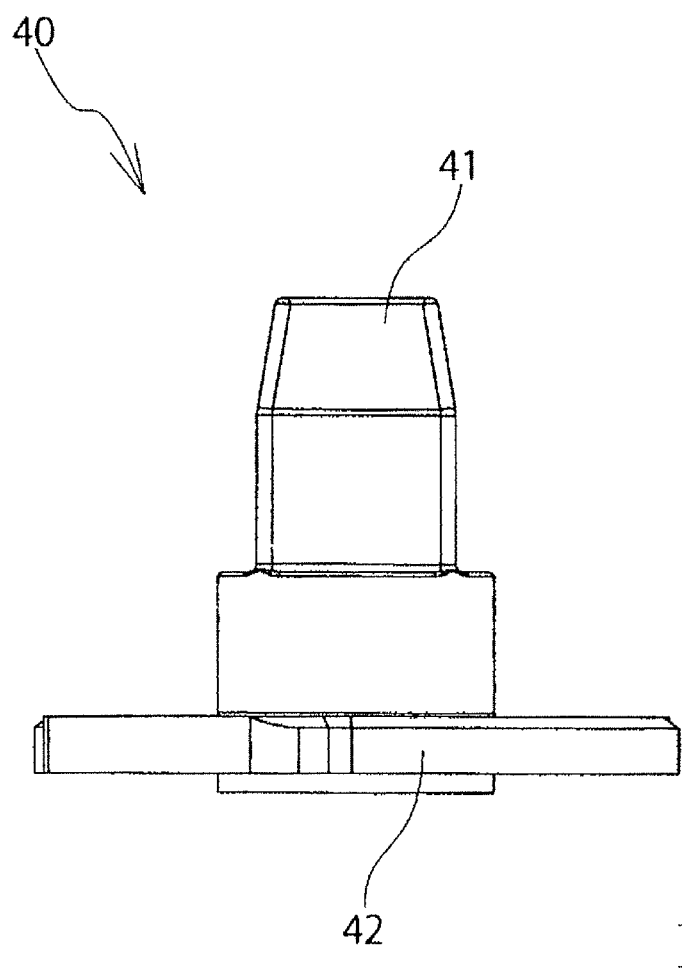
FIG. 16 is a side view of the rotor portion.
Figure 17:
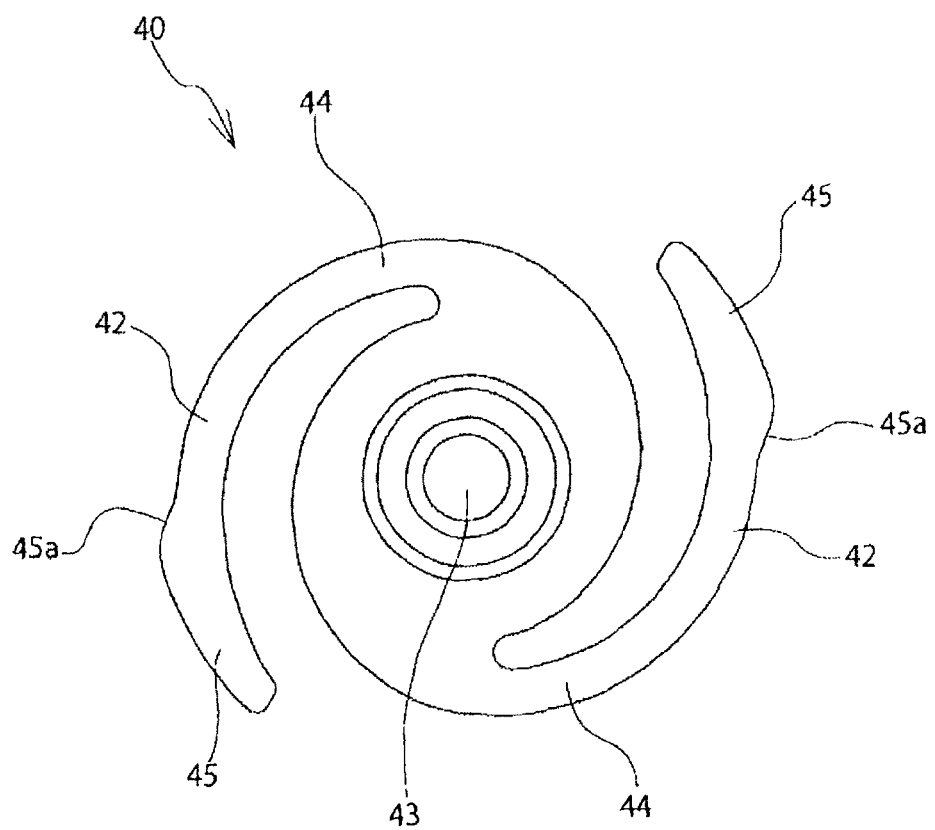
FIG. 17 is a bottom view of the rotor portion.

Specifically, as shown in FIGS. 14 and 17, the blade portions 42 alternately extend in such a way as to wrap around an outside from the center. Namely, from two portions of the outer circumference, which are positioned in a diametrical direction of the shaft portion 41, the blade portions 42 extend in the spiral manner, or in a whorl manner at an approximately 130 degree angle clockwise as viewed from above. Each blade portion 42 is formed with a cross-sectional surface of a rectangular column bar shape.

Incidentally, although the blade portions 42 are formed with two pieces, the number of the blade portions 42 is not limited to that, and the blade portions 42 may be formed with a single piece, or three pieces or above. Also, although the blade portions 42 are formed in the spiral manner, the form of the blade portions 42 is not limited to that, and the blade portions 42 may be formed in a radial manner.

(Axis Hole 43)

As shown in FIGS. 17, 18, and 26 to 28, the axis hole 43 is formed in a bottom portion of the shaft portion 41, and fitted into the later-mentioned fixed axis 92 inside the housing 20. The rotor portion 40 is rotatably supported inside the housing 20 at the center of the axis hole 43 fitted into the fixed axis 92.

(Deformation Portions 44)

As shown in FIGS. 1, 14, and 17, the deformation portions 44 allow the blade portions 42 to expand the diameter in one rotational direction in response to the resistance received from the viscous fluid (not shown in the figures), and allow the blade portions 42 to reduce the diameter in the other rotational direction. The deformation portions 44 are positioned in root portions of the blade portions 42.

(Engaging Portions 45)

As shown in FIGS. 1, 14, 23, and 24, at the time of diameter expansion of the blade portions 42 (see FIG. 23), the engaging portions 45 engage with the locking portions 51 of the ring member 50 so as to integrally rotate the ring member 50.

Specifically, the engaging portions 45 protrude from the outer circumference of the end portions of the blade portions 42, and are formed in a shape matched with the concave-shaped locking portions 51 of the ring member 50. In back end portions of the engaging portions 45, i.e., on an opposite side of the end portions of the blade portions 42, there are formed inclined surfaces 45a obliquely inclining downwardly. At the time of diameter expansion of the blade portions 42, the inclined surfaces 45a slide and contact with the inclined surface 54 of the ring member 50, and when the engaging portions 45 of the blade portions 42 are disengaged from the locking portions 51 of the ring member 50, the inclined surfaces 45a allow the blade portions 42 to smoothly reduce the diameter.

(Ribs 46)

Figure 18:
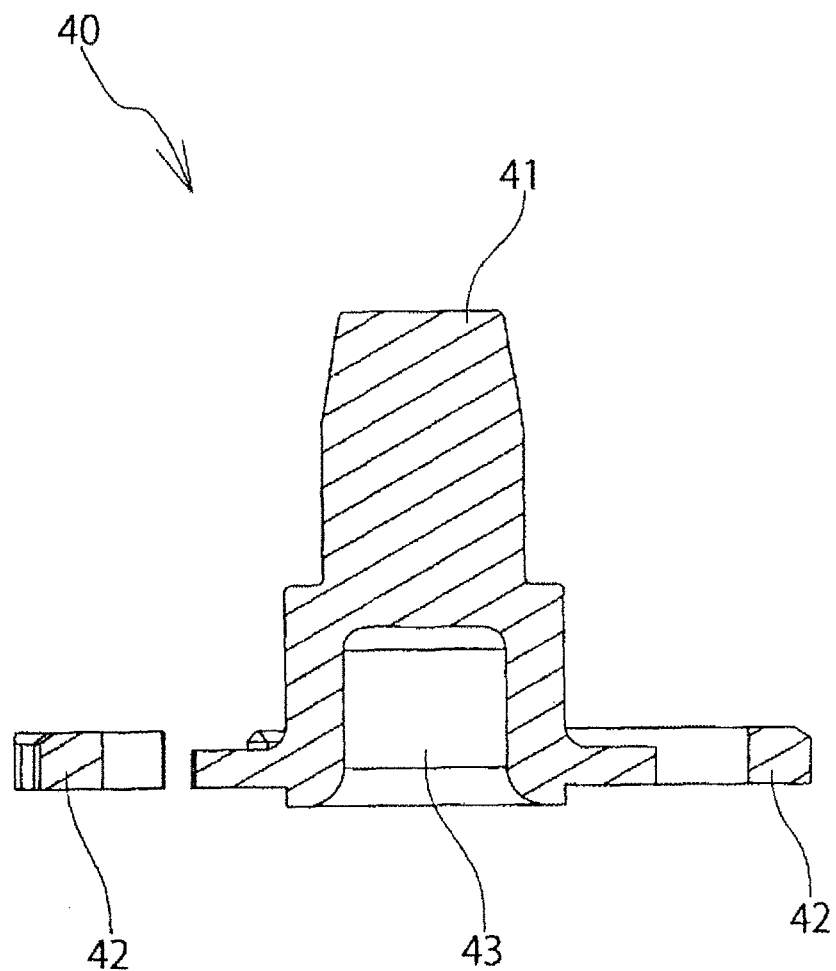
FIG. 18 is a cross-sectional view taken along a line D to D in FIG. 14.

As shown in FIGS. 1, 14, and 18, the ribs 46 are formed so as to extend toward the deformation portions 44 from a circumference of the shaft portion 41, to heighten in a stepwise form, and to gradually lower toward the deformation portions 44.

The ribs 46 face the later-mentioned step portion 104 of the cap 30, thicken a thickness of the rotor portion 40, and are provided for the purpose of reinforcement.

(Outer Circumferential Wall 80)

As shown in FIGS. 2, 5, 6, 8, 9, and 28, the outer circumferential wall 80 is formed in a cylinder shape whose upper surface is open, and includes the inner circumferential surface 81.

(Bottom Wall 90)

As shown in FIGS. 2, 6 to 9, and 28, the bottom wall 90 blocks a bottom surface of the outer circumferential wall 80, and is formed in a circular disc form.

Specifically, as shown in FIGS. 2, 6 to 9, and 28, the bottom wall 90 roughly comprises the following respective portions.

Incidentally, each portion of the bottom wall 90 is not limited to the following (1) to (4).

(1) Bottom Surface 91

As shown in FIGS. 2, 6 to 9, and 28, a bottom surface 91 is positioned in a bottom of the bottom wall 90.

(2) Fixed Axis 92

As shown in FIGS. 2, 6, 8, 9, and 28, the fixed axis 92 protrudes inside the housing 20 from the center of the bottom surface 91. In the fixed axis 92, there is rotatably fitted the axis hole 43 of the rotor portion 40.

(3) Elevated Portion 93

As shown in FIGS. 2, 6, 8, 9, and 28, an elevated portion 93 is positioned around the fixed axis 92, heightens one step from the bottom surface 91, protrudes in the convex shape upwardly, and is formed annularly as a whole.

(4) Annular Convex Portion 94

As shown in FIGS. 2, 6, 8, 9, and 28, an annular convex portion 94 is positioned along the inner circumferential surface 81 of the outer circumferential wall 80, heightens one step from the bottom surface 91, protrudes in the convex shape upwardly, and is formed annularly as a whole.

Incidentally, although the annular convex portion 94 is continuously formed, the annular convex portion 94 is not limited to that, and may be intermittently formed, or although an upper surface of the annular convex portion 94 is formed flatly, the upper surface of the annular convex portion 94 is not limited to that, and may be inclined, or be formed non-flatly so as to have a waveform and the like having a difference in height.

On the other hand, as shown in FIGS. 2, 6, 8, 9, and 28, the bottom wall 90 is positioned between the annular convex portion 94 on an outer circumferential side and the elevated portion 93 on an inner circumferential side; lowers one step from the annular convex portion 94 and the elevated portion 93; and is annularly formed.

(Upper Wall 100)

As shown in FIGS. 10 to 13, and 28, the upper wall 100 blocks an opening front surface of the housing 20, and is formed in the circular disc form.

Specifically, as shown in FIGS. 10 to 13, and 28, the upper wall 100 roughly comprises the following respective portions.

Incidentally, each portion of the upper wall 100 is not limited to the following (1) to (6).

(1) Inner Surface 101

As shown in FIGS. 10 to 13, and 28, an inner surface 101 is positioned on an inner surface facing the bottom surface 91 of the housing 20.

(2) Through-Hole 102

As shown in FIGS. 2, 10 to 13, and 28, the through-hole 102 is positioned in the center of the upper wall 100, and passes through into and out of the upper wall 100. In the through-hole 102, the shaft portion 41 of the rotor portion 40 is inserted to pass through, and the shaft portion 41 protrudes into and out of the housing 20.

(3) Inner Edge Portion 103

As shown in FIGS. 10 to 13, and 28, an inner edge portion 103 is positioned around the through-hole 102, upwardly bends in an L shape of a cross-sectional surface, and is annularly formed as a whole.

(4) Step Portion 104

As shown in FIGS. 10 to 13, and 28, the step portion 104 is positioned on a lower side of the inner edge portion 103, lowers one step from the inner surface 101, downwardly protrudes in the convex shape, and is annularly formed as a whole. Inside a space surrounded by a side surface of the step portion 104 and a lower surface of the inner edge portion 103, there is positioned the seal member 60 fitted into the shaft portion 41 of the rotor portion 40.

(5) Annular Convex Portion 105

As shown in FIGS. 10 to 13, and 28, an annular convex portion 105 is positioned by facing the annular convex portion 94 of the housing 20, lowers one step from the inner surface 101, downwardly protrudes in the convex shape, and is annularly formed as a whole.

Incidentally, although the annular convex portion 105 is continuously formed, the annular convex portion 105 is not limited to that, and may be intermittently formed, or although a lower surface of the annular convex portion 105 is formed flatly, the lower surface of the annular convex portion 105 is not limited to that, and may be inclined, or be formed non-flatly so as to have the waveform and the like having the difference in height.

On the other hand, as shown in FIGS. 10 to 13, and 28, the inner surface 101 is positioned between the annular convex portion 105 on the outer circumferential side and the step portion 104 on the inner circumferential side; heightens one step from the annular convex portion 105 and the step portion 104; and is annularly formed.

(6) Fitting Groove 106

As shown in FIGS. 10 to 13, and 28, a fitting groove 106 is positioned on the most outer circumference, heightens one step from the annular convex portion 105, and is annularly formed as a whole. In the fitting groove 106, there is fitted the outer circumferential wall 80 of the housing 20.

(Outer Edge Portion 110)

As shown in FIGS. 10 to 13, and 28, the outer edge portion 110 fringes the outer circumference of the upper wall 100 annularly, and is fitted into an outside of the outer circumferential wall 80 of the housing 20.

(Braking Field A and Non-Braking Field B)

Figure 28:
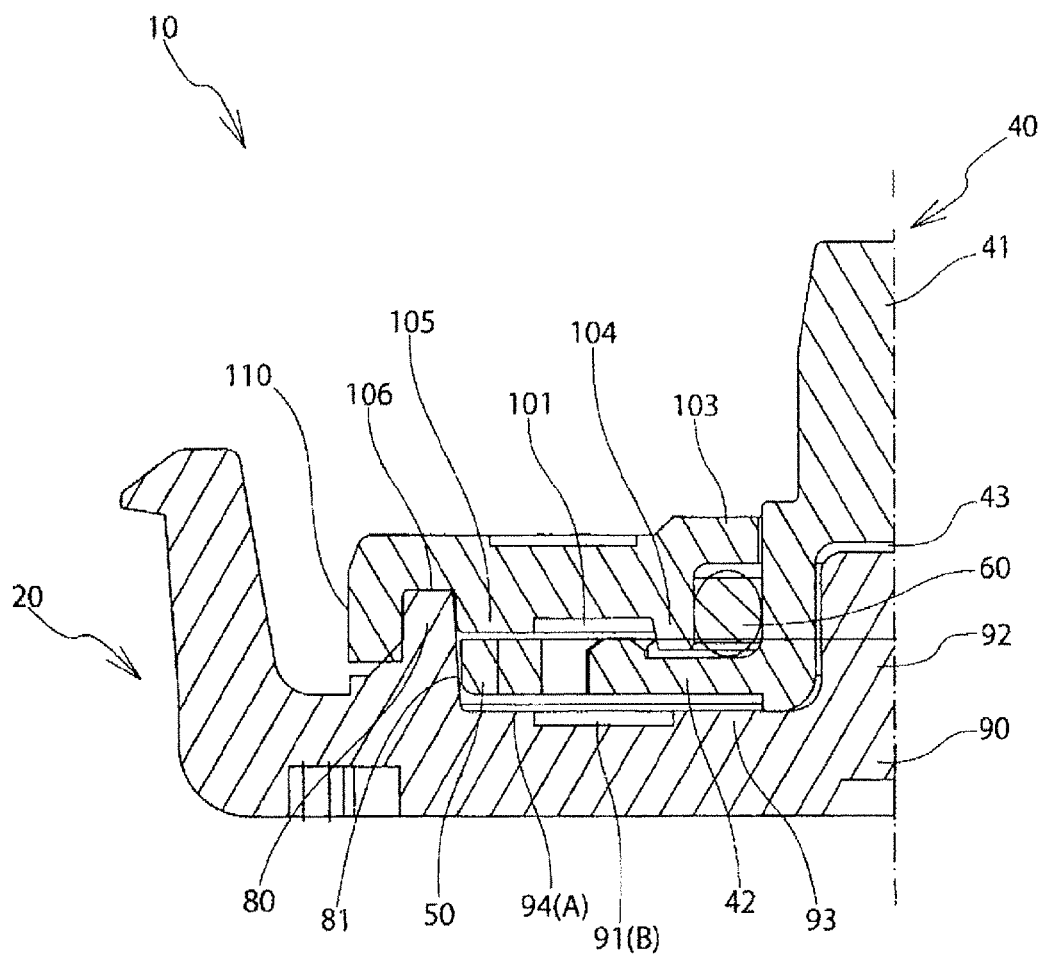
FIG. 28 is an enlarged view of a left half of FIG. 26.

As shown in FIG. 28, in the housing 20 or the cap 30, there is provided a braking field A in which a gap in an axial direction of the rotor portion 40 becomes "small" at the time of diameter expansion of the blade portions 42.

Specifically, the braking field A is structured by the annular convex portions 94 and 105 provided in the axial direction of the housing 20 or the cap 30.

Incidentally, although the annular convex portion 94 is provided in the housing 20, and the annular convex portion 105 is provided in the cap 30, they are not limited to those, and the annular convex portion may be provided only in one of the housing 20 or the cap 30.

As shown in FIG. 28, inside the inner circumferential side of the braking field A, there is provided a non-braking field B. The non-braking field B is a field in which the gap in the axial direction of the rotor portion 40 becomes "large".

Specifically, the non-braking field B is structured by the bottom surface 91 of the housing 20 lowering one step from the annular convex portion 94, and the inner surface 101 of the cap 30 facing the bottom surface 91, and heightening one step from the annular convex portion 105.

Incidentally, although the bottom surface 91 is provided in the housing 20, and the inner surface 101 is provided in the cap 30, they are not limited to those, and the bottom surface 91 of the housing 20 may be singularly provided, or the inner surface 101 of the cap 30 may be singularly provided as well.

(Movement of Damper 10)

Next, a movement of the damper 10 comprising the aforementioned structure in an assembly state in which the viscous fluid (not shown in the figures) is filled inside, will be explained.

Figure 24:
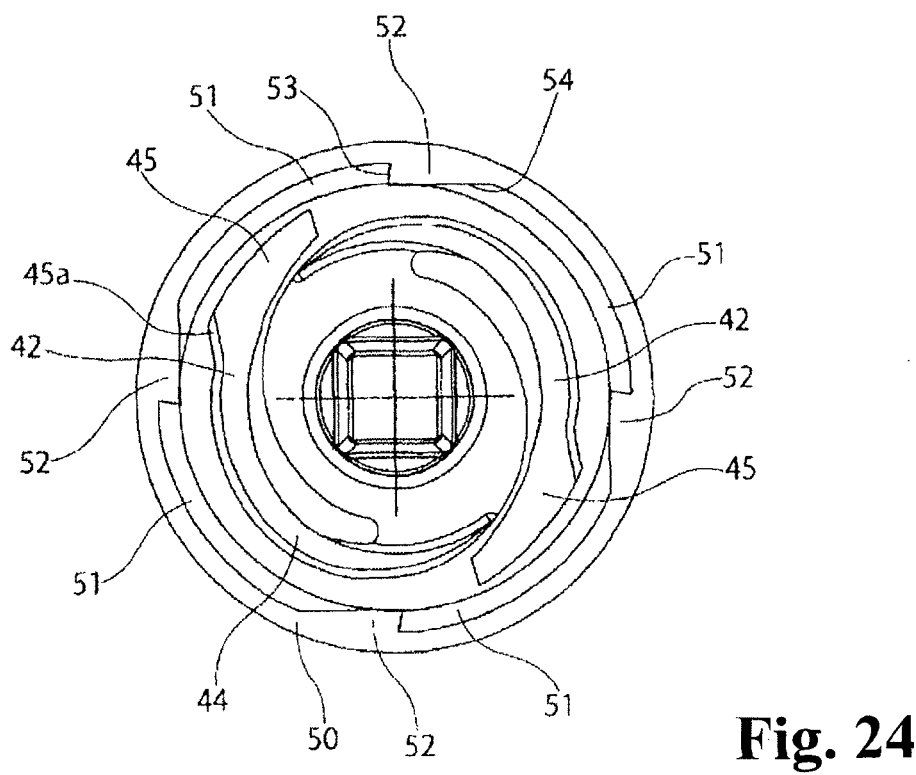
FIG. 24 is a plan view for explaining the engagement state between the rotor portion and the ring member at a time of diameter reduction.
Figure 25:
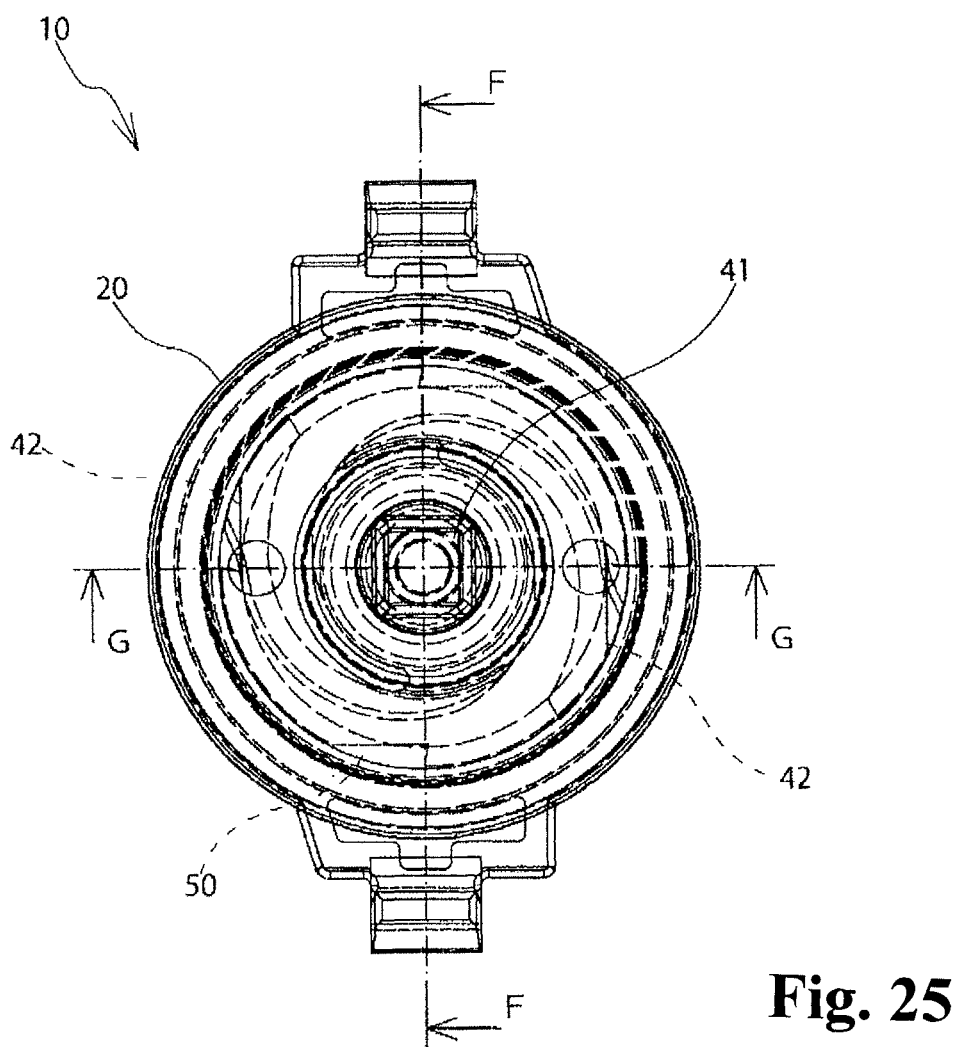
FIG. 25 is a plan view of the damper in the first embodiment of the present invention.
Figure 26:
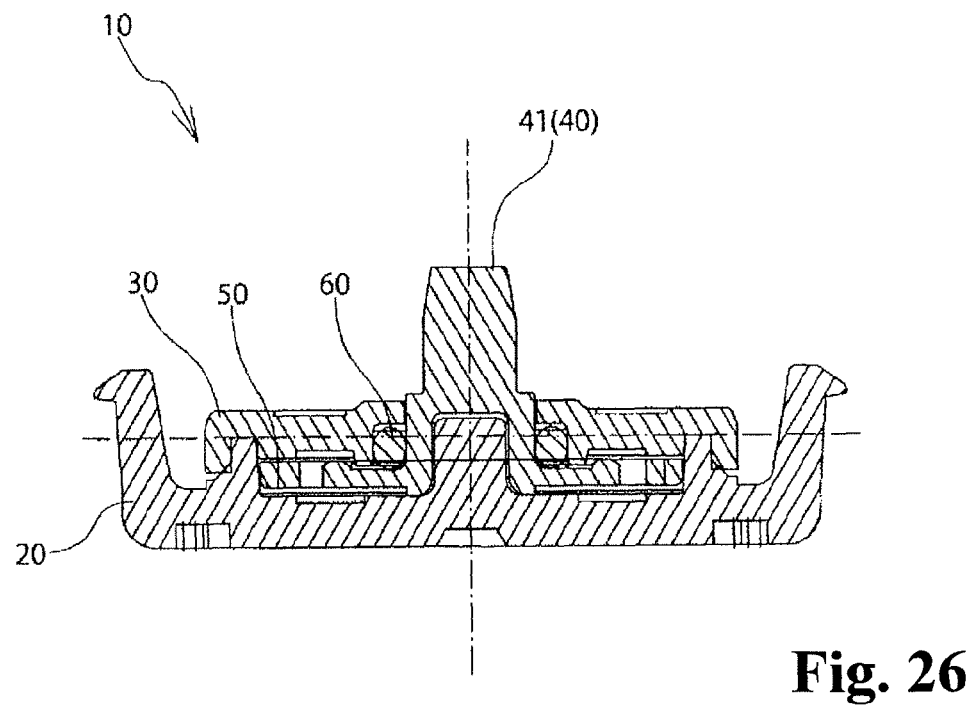
FIG. 26 is a cross-sectional view taken along a line F to F in FIG. 25.
Figure 27:
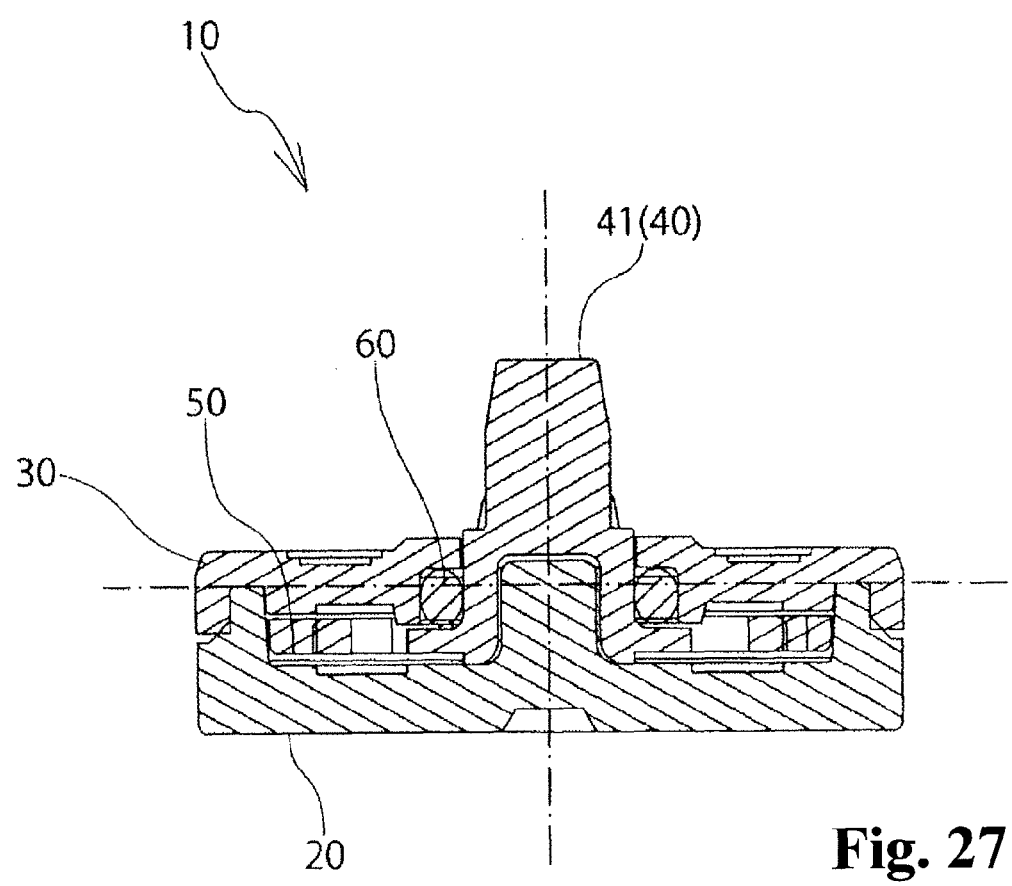
FIG. 27 is a cross-sectional view taken along a line G to G in FIG. 25.

First, in FIGS. 23 to 25, when the shaft portion 41 of the rotor portion 40 rotates clockwise, the blade portions 42 expand the diameter.

When the blade portions 42 expand the diameter, as shown in FIG. 23, the convex-shaped engaging portions 45 fit into the concave-shaped locking portions 51 of the ring member 50, and the end portions of the blade portions 42 bump into the locking surface 53.

Consequently, a rotational force of the rotor portion 40 is transmitted to the ring member 50, and the ring member 50 integrally rotates with the blade portions 42 inside the housing 20 so as to generate a high torque.

At the same time, as shown in FIG. 28, the ring member 50 and the end portions of the blade portions 42 which have expanded the diameter rotate in the braking field A on the outer circumferential side in which the gap in the axial direction inside the housing 20 becomes "small".

Consequently, in a portion wherein the gap in the axial direction is "small", a large interference force, i.e., a torque generates in the blade portions 42 rotating inside the housing 20.

Due to the synergistic effects, a generated torque of the damper 10 increases.

On the other hand, in FIGS. 23 to 25, when the shaft portion 41 of the rotor portion 40 rotates counterclockwise, the blade portions 42 reduce the diameter.

At that time, as shown in FIG. 25, the convex-shaped engaging portions 45 of the blade portions 42 are disengaged from the concave-shaped locking portions 51 of the ring member 50, and a connected state between the blade portions 42 and the ring member 50 is cut off, so that the blade portions 42 separately rotate in a state wherein the blade portions 42 have reduced the diameter.

Consequently, there generates a gap in a circumferential direction between the blade portions 42 and the inner circumference of the ring member 50, and the viscous fluid (not shown in the figures) flows in the gap so as to control the generation of the torque.

At the same time, although it is not shown in the figures, the end portions of the blade portions 42 are positioned in the non-braking field B on the inner circumferential side in which the gap in the axial direction inside the housing 20 becomes "large".

In a portion wherein the gap in the axial direction is "large", an interference force generated in the blade portions 42 rotating inside the housing 20, i.e., the torque weakens.

Due to the aforementioned synergistic effects, the generated torque of the damper 10 is decreased. Incidentally, as a result of an experiment with a prototype, torque differences were approximately three to five times.

By the present damper 10, a damper with a different torque depending on the rotational direction can be provided, and the present damper 10 can be also used as a one-way-type damper.

(Second Embodiment)

Next, with FIGS. 29 to 35, a second embodiment of the present invention will be explained.

As shown in FIGS. 29 to 33, first, a characteristic of the present embodiment is that in blade portions 220, there are provided engaging portions 221 and 222 in at least two portions engaging with a ring member 230.

Figure 32:
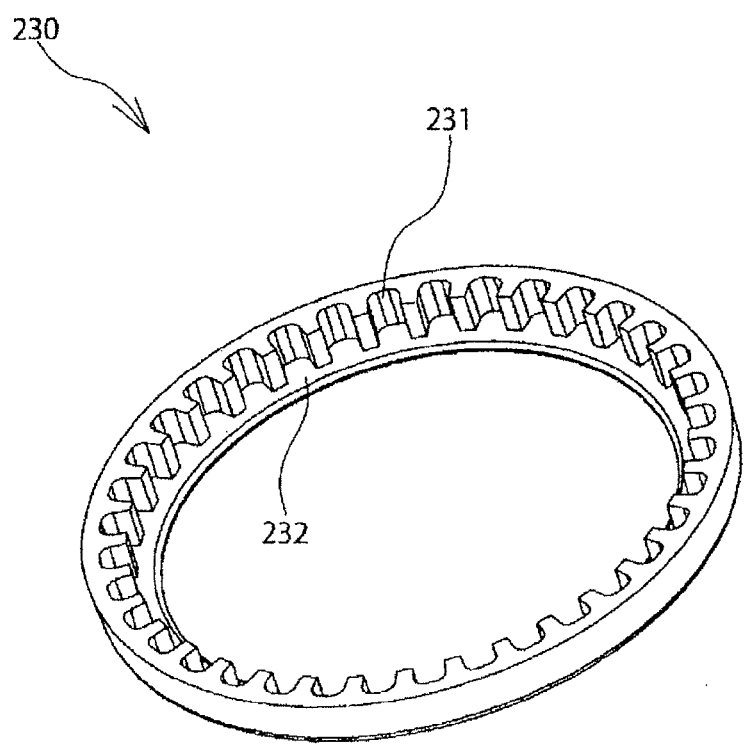
FIG. 32 shows the second embodiment of the present invention, and is a perspective view of the ring member.
Figure 33:
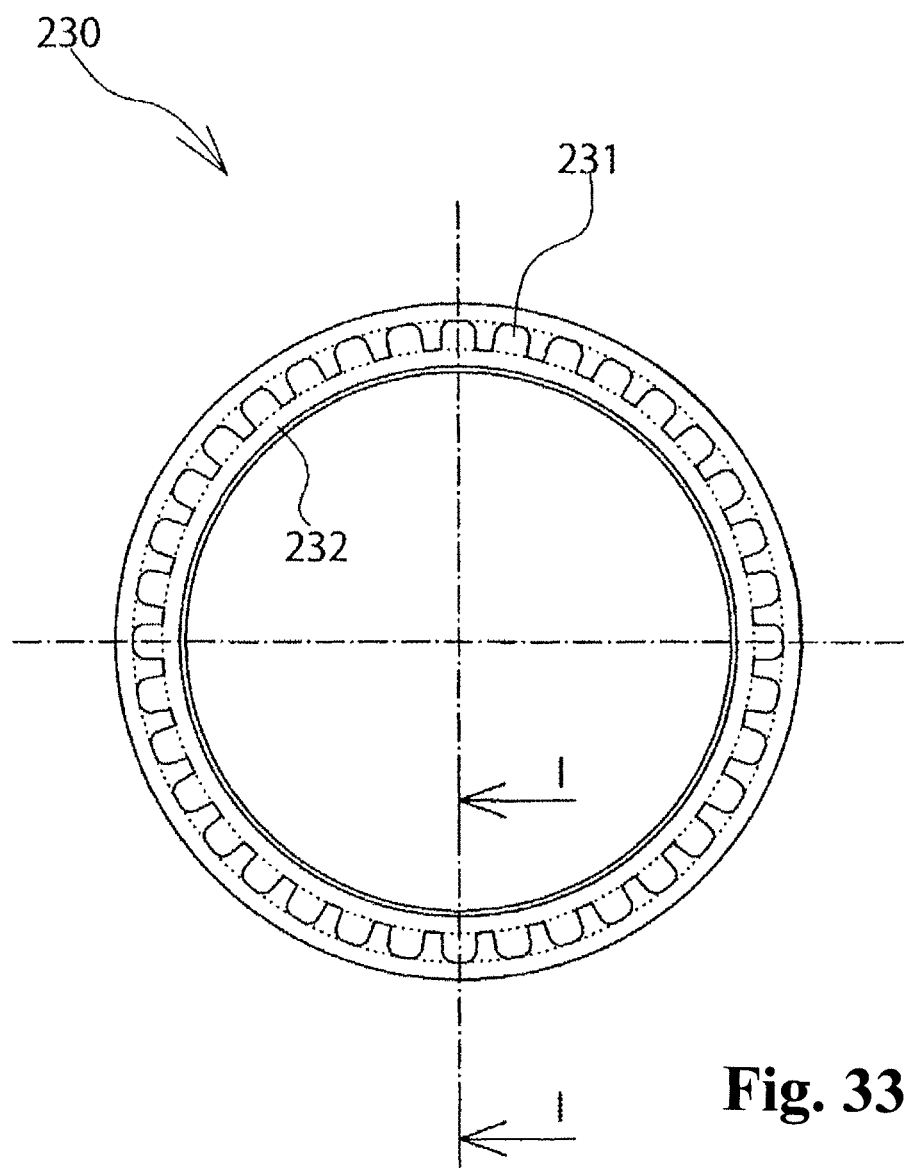
FIG. 33 is a plan view of FIG. 32.
Figure 34:
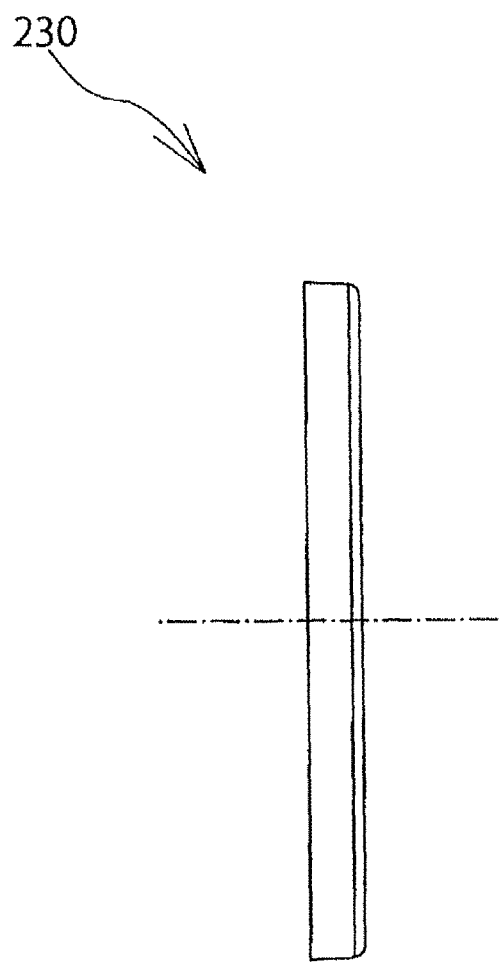
FIG. 34 is a side view of FIG. 32.
Figure 35:
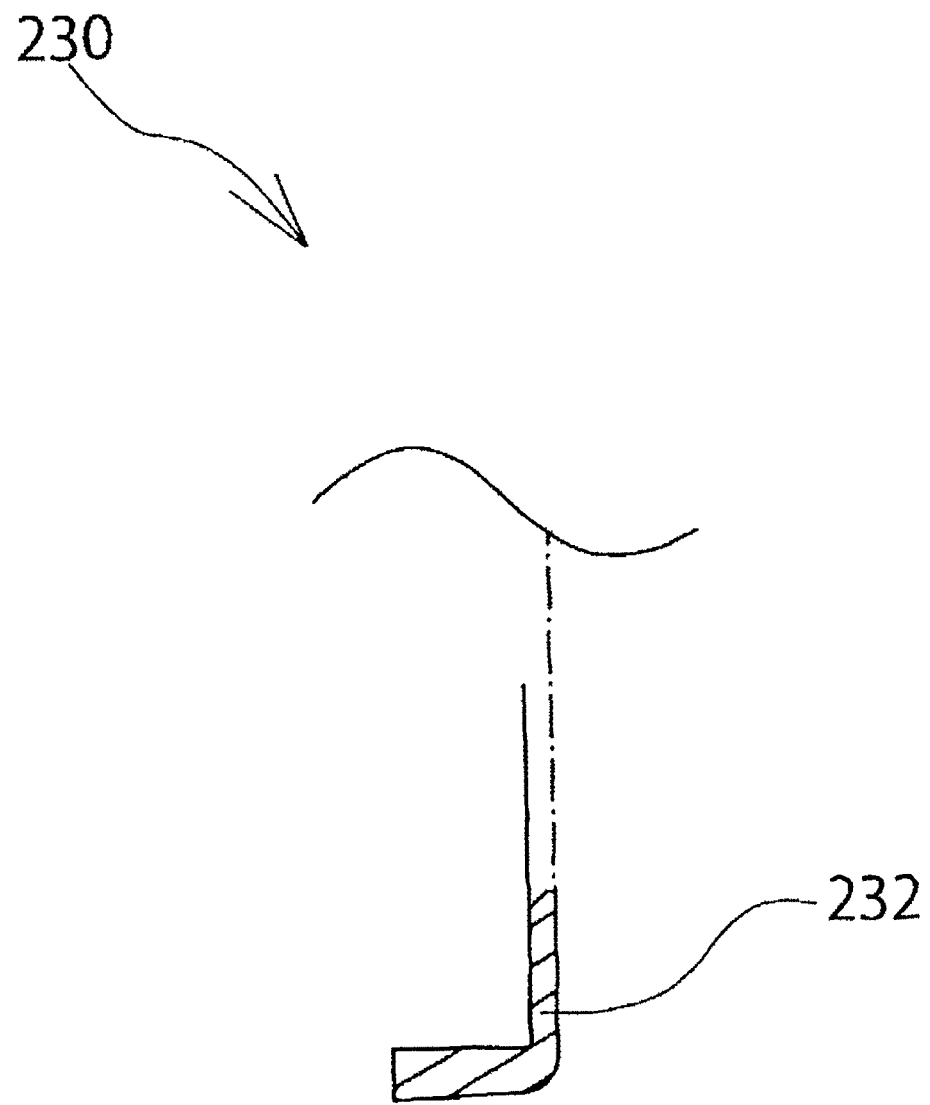
FIG. 35 is a cross-sectional view taken along a line I to I in FIG. 33.

Secondly, as shown in FIGS. 32, 33, and 35, a characteristic of the present embodiment is that in an inner circumferential portion of the ring member 230, in which locking portions 231 of the ring member 230 are provided, there is provided a wall 232 in a thickness direction.

Figure 29:
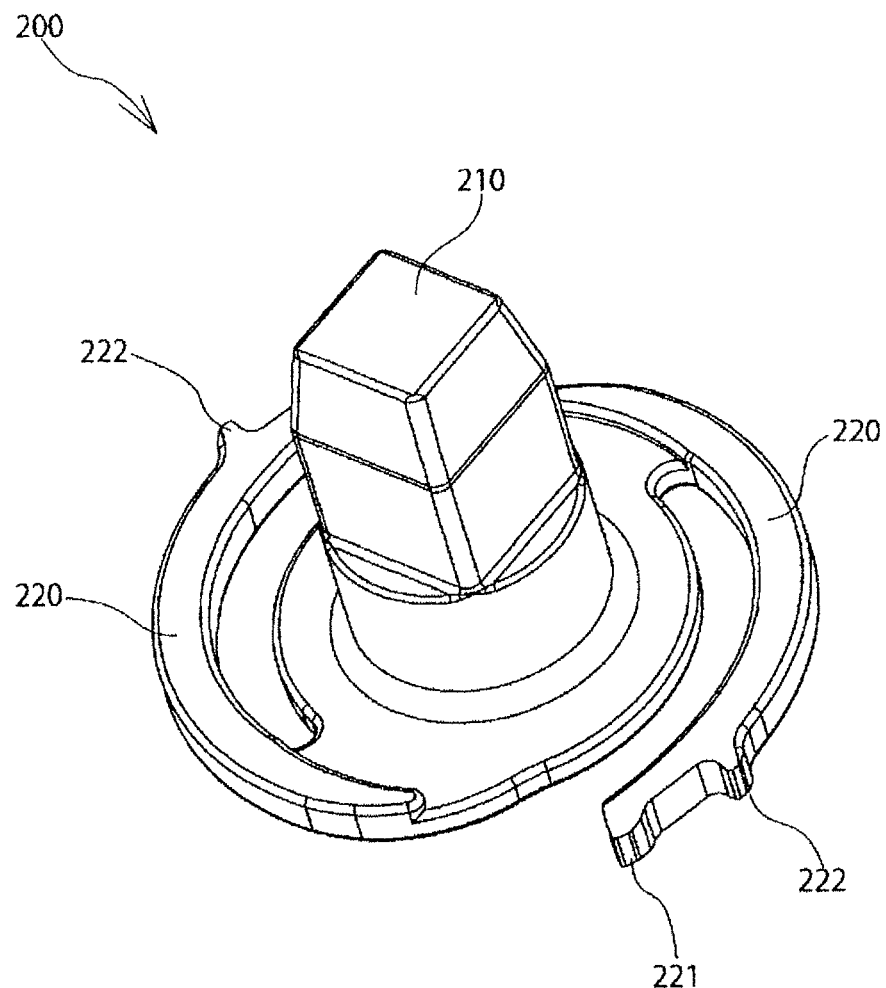
FIG. 29 shows a second embodiment of the present invention, and is a perspective view of the rotor portion.
Figure 30:
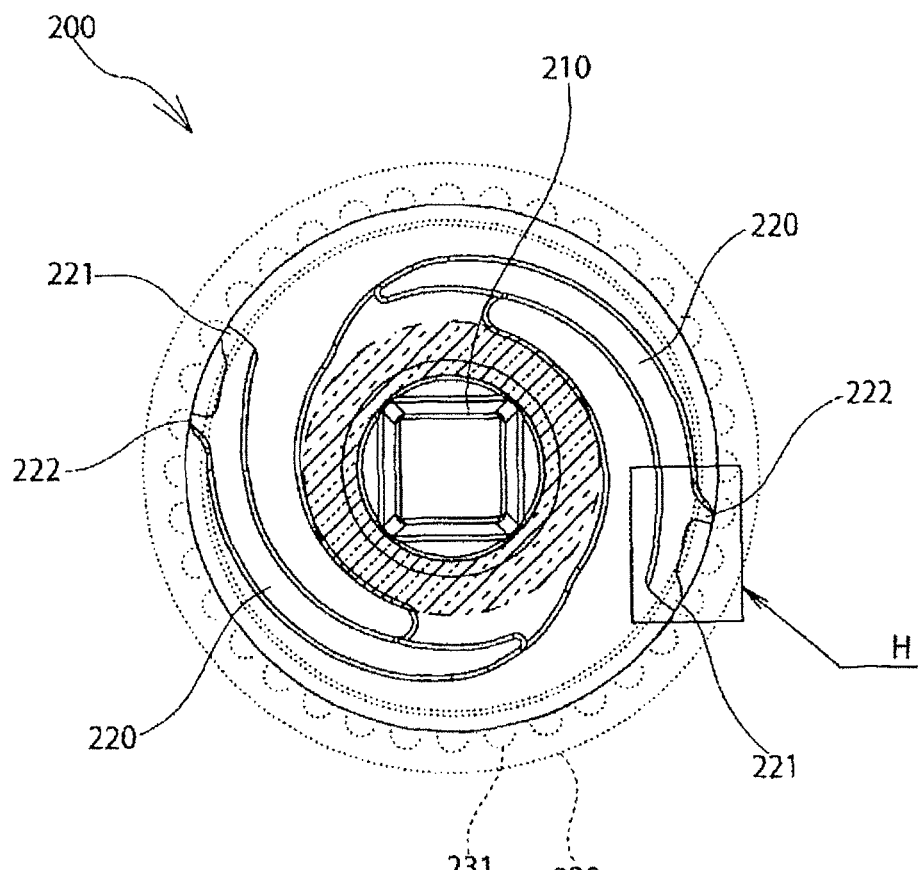
FIG. 30 is a plan view of FIG. 29.

Specifically, as shown in FIGS. 29 and 30, a rotor portion 200 roughly comprises a shaft portion 210 and the blade portions 220.

Figure 31:
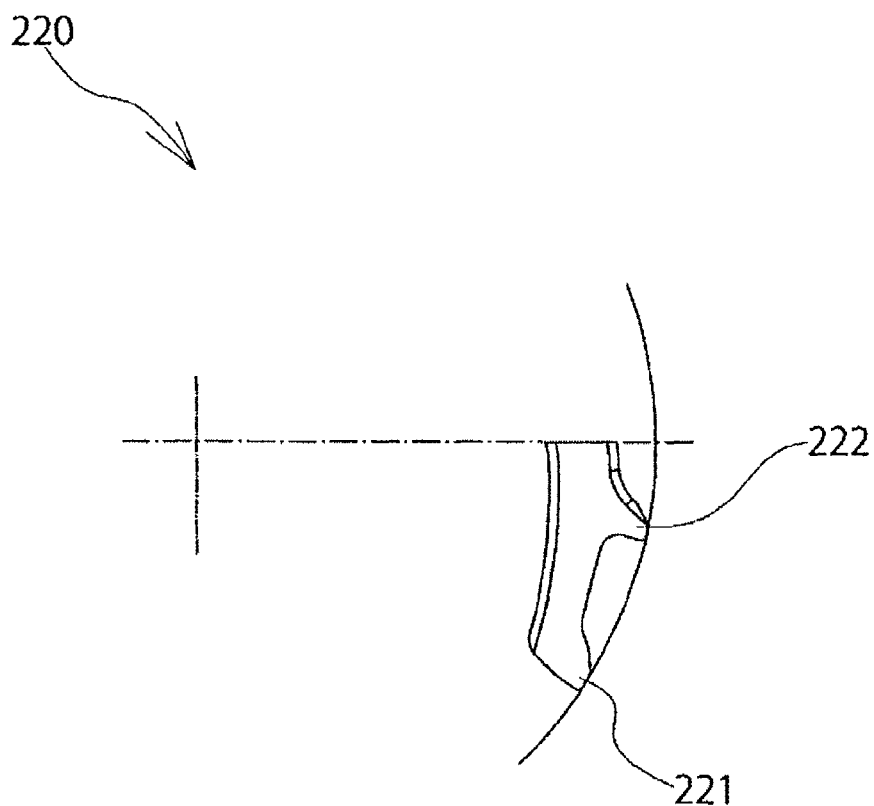
FIG. 31 is an enlarged view of a portion H in FIG. 30.

As shown in FIGS. 29 to 31, in the end portions of the blade portions 220, there are provided two pieces of the first and the second engaging portions 221 and 222. As shown in FIGS. 29 to 31, the first and the second engaging portions 221 and 222 protrude in the convex shape from an outer circumferential surface of the end portions of the blade portions 220 so as to fit into the locking portions 231 formed in the concave shape along an inner circumferential surface of the after-mentioned ring member 230.

Incidentally, although the engaging portions 221 and 222 are provided with two pieces, they are not limited to the two pieces, and may be provided with three pieces or above.

In the ring member 230, there are provided the locking portions 231 with a plurality of pieces formed in the concave shape along the inner circumferential surface thereof. The locking portions 231 are continuously provided along the inner circumferential surface of the ring member 230, and a gap between adjoining locking portions 231 is made smaller than a gap between the two pieces of the engaging portions 221 and 222, and is provided with, for example, double pitches. Namely, the two pieces of the engaging portions 221 and 222 are alternately fitted into the locking portions 231.

Also, as shown in FIGS. 32, 33, and 35, in the inner circumferential portion of the ring member 230, there is provided the wall 232 in one end portion in the thickness direction, which inwardly projects in a radial direction up to halfway in a ring shape.

At an assembly time, by looking at the wall 232 of the ring member 230, although it is not shown in the figures, the wall 232 is fitted into the housing 20 by facing the wall 232 toward the bottom wall 90 (see FIG. 2) of the housing 20. After that, the blade portions 220 of the rotor portion 200 are fitted into an inside of the inner circumferential portion of the ring member 230 from a side without the wall 232 of the ring member 230.

Incidentally, on the contrary, if the side without the wall 232 of the ring member 230 is fitted toward the bottom wall 90 (see FIG. 2) of the housing 20, when the blade portions 220 of the rotor portion 200 are fitted in, the blade portions 220 or the engaging portions 221 and 222 bump into the wall 232 so as to interfere. Consequently, it can be easily distinguished whether or not the front and back in a fitting direction of the ring member 230 are opposite.

(Third Embodiment)

Next, with FIGS. 36 to 39, a third embodiment of the present invention will be explained.

Figure 36:
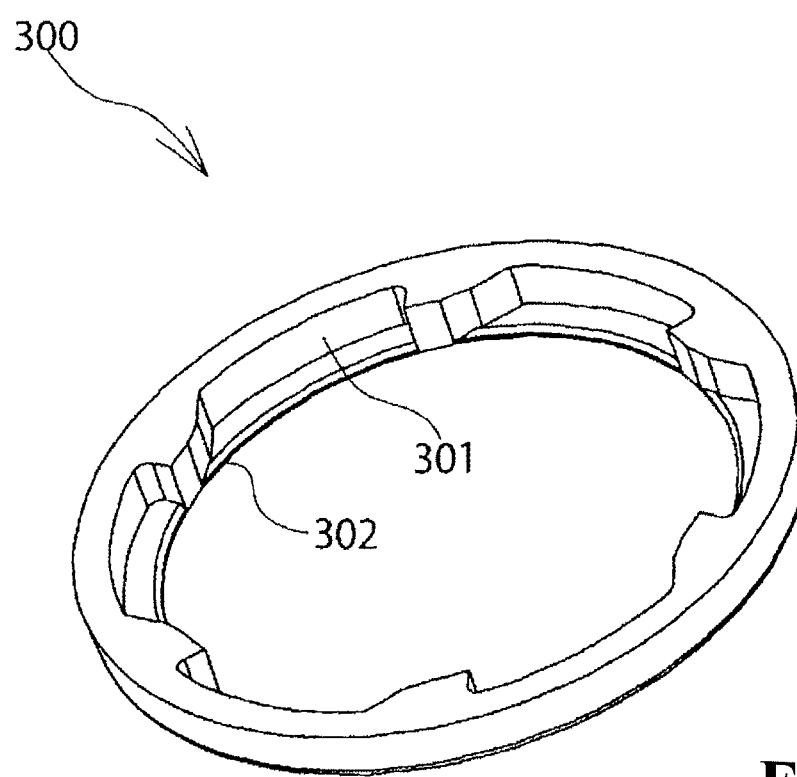
FIG. 36 shows a third embodiment of the present invention, and is a perspective view of the ring member.
Figure 37:
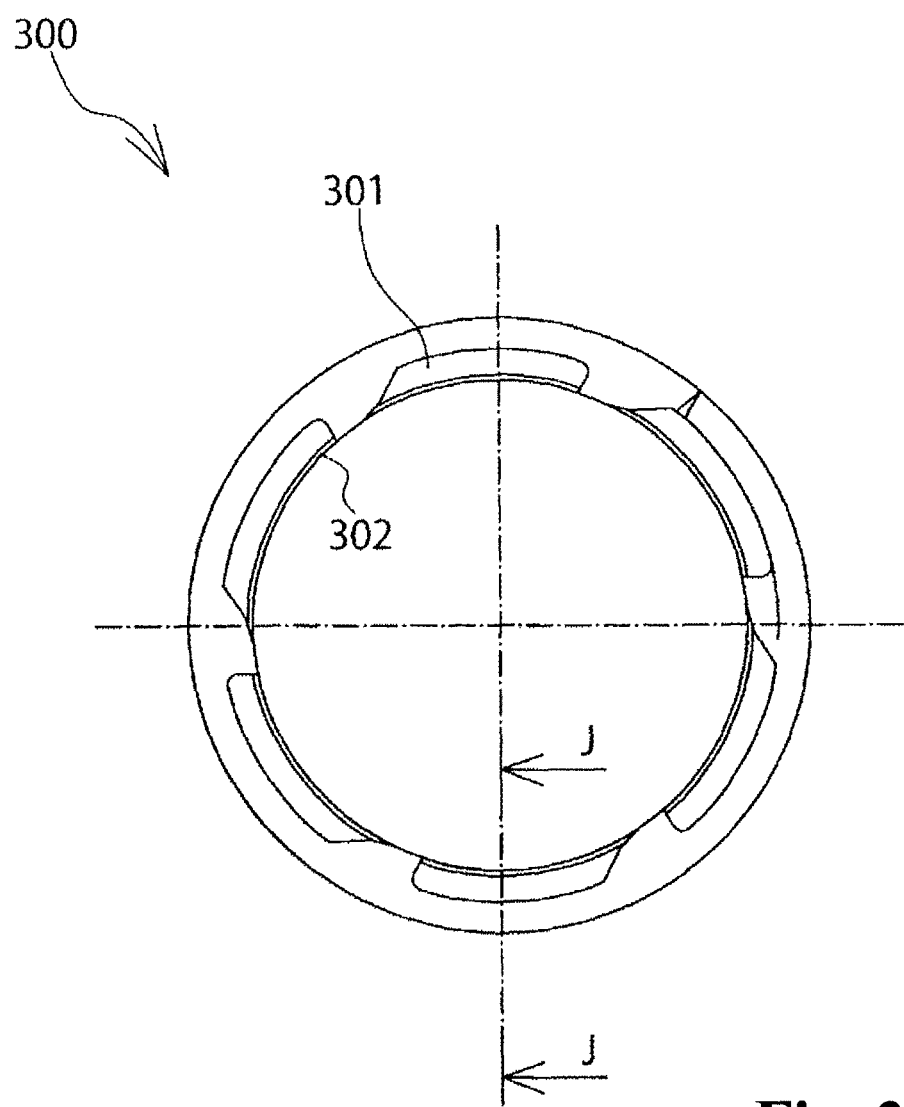
FIG. 37 is a plan view of FIG. 36.
Figure 38:
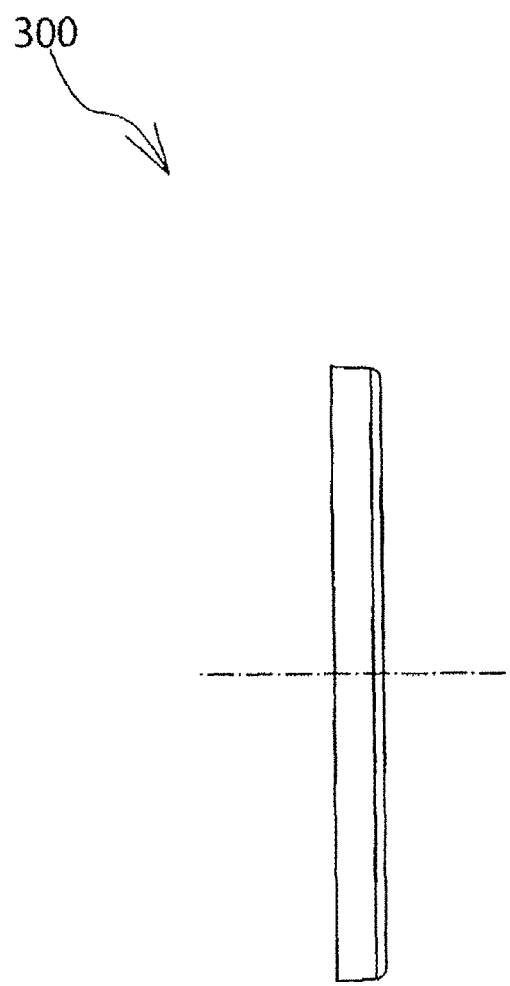
FIG. 38 is a side view of FIG. 36.
Figure 39:
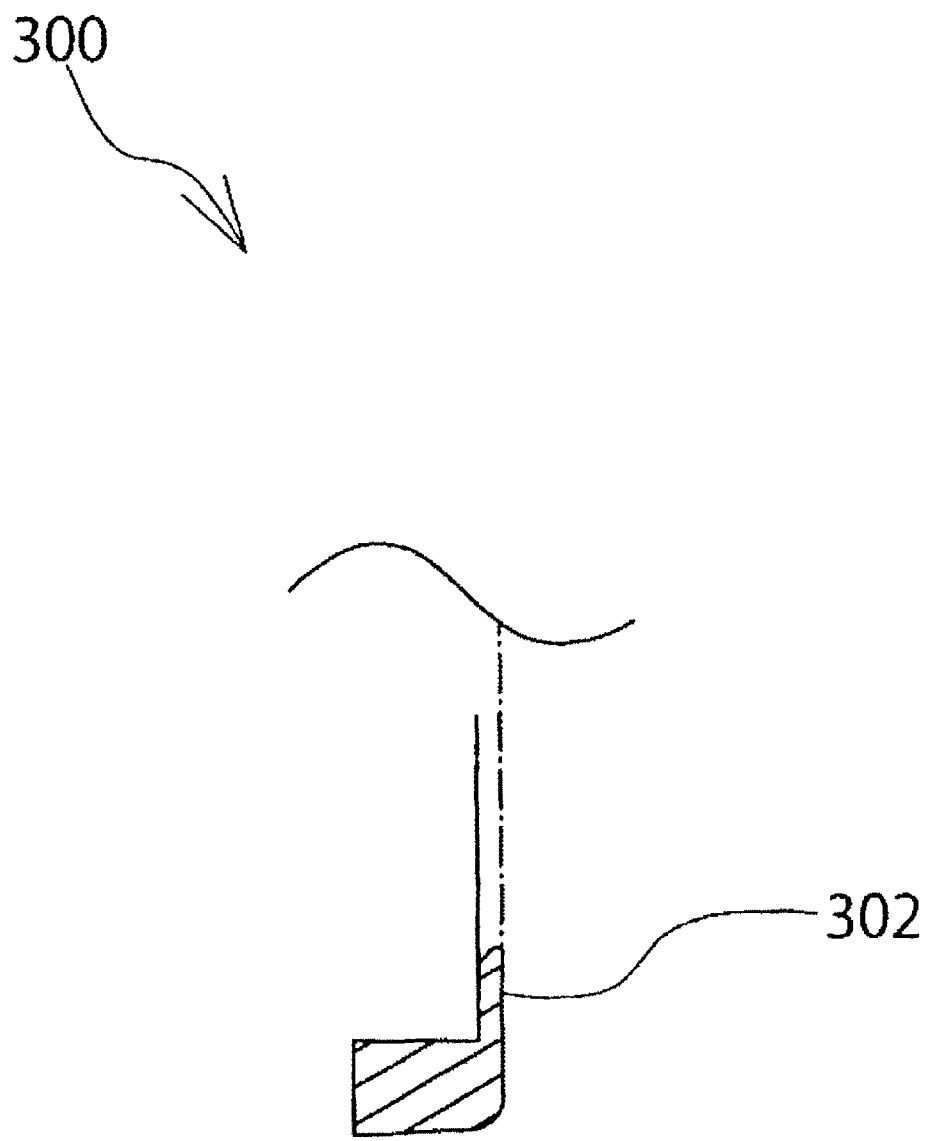
FIG. 39 is a cross-sectional view taken along a line J to J in FIG. 37.

A characteristic of the present embodiment is that as is the case with the second embodiment explained with FIGS. 29 to 35, as shown in FIGS. 36, 37, and 39, in an inner circumferential portion of a ring member 300, wherein locking portions 301 of the ring member 300 are provided, there is provided a wall 302 in the thickness direction.

Specifically, as shown in FIGS. 36, 37, and 39, in the inner circumferential portion of the ring member 300, and in one end portion in the thickness direction, there is provided the wall 302 inwardly projecting in the radial direction up to halfway in the ring shape.

(Fourth Embodiment)

Next, with FIGS. 40 to 42, a fourth embodiment of the present invention will be explained.

Figure 40:
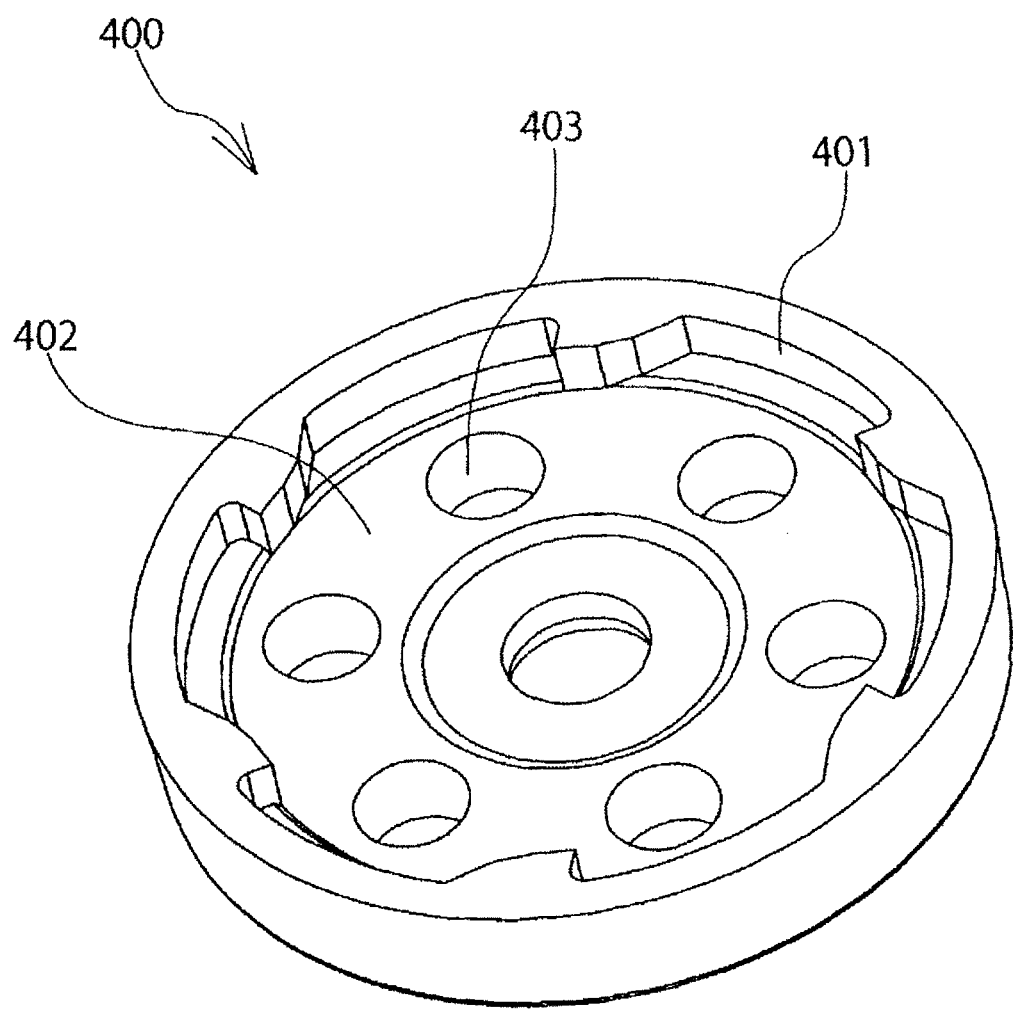
FIG. 40 shows a fourth embodiment of the present invention, and is a perspective view of the ring member.
Figure 41:
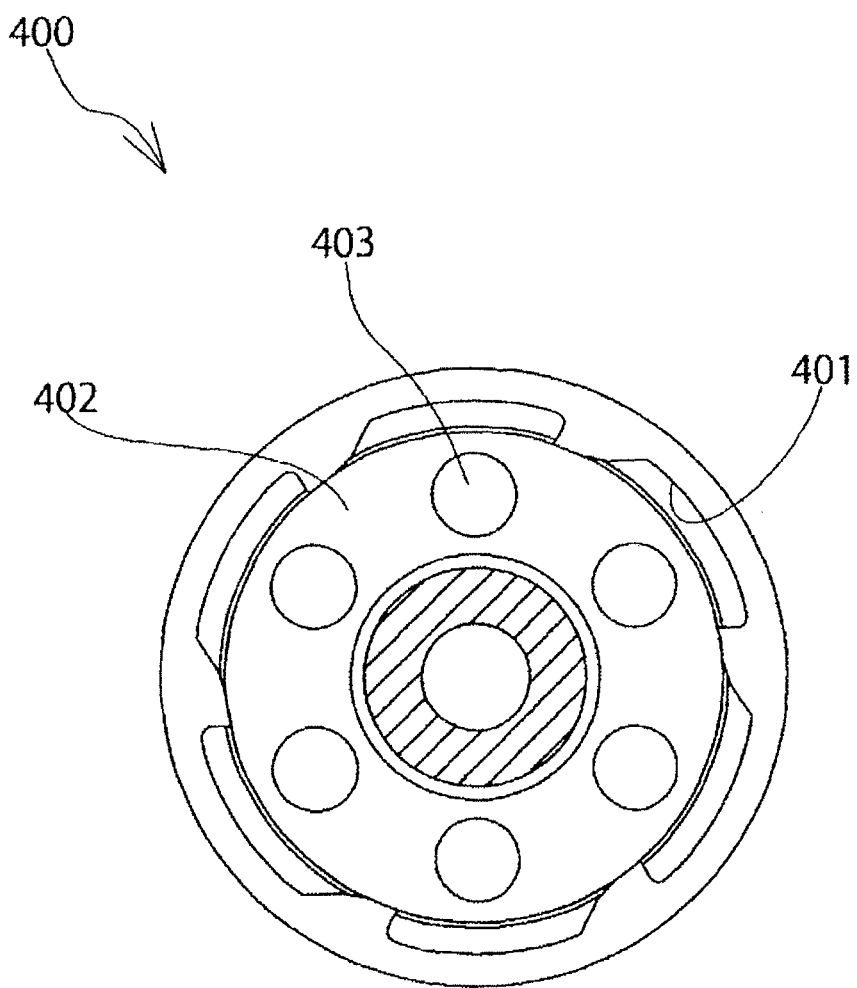
FIG. 41 is a plan view of FIG. 40.
Figure 42:
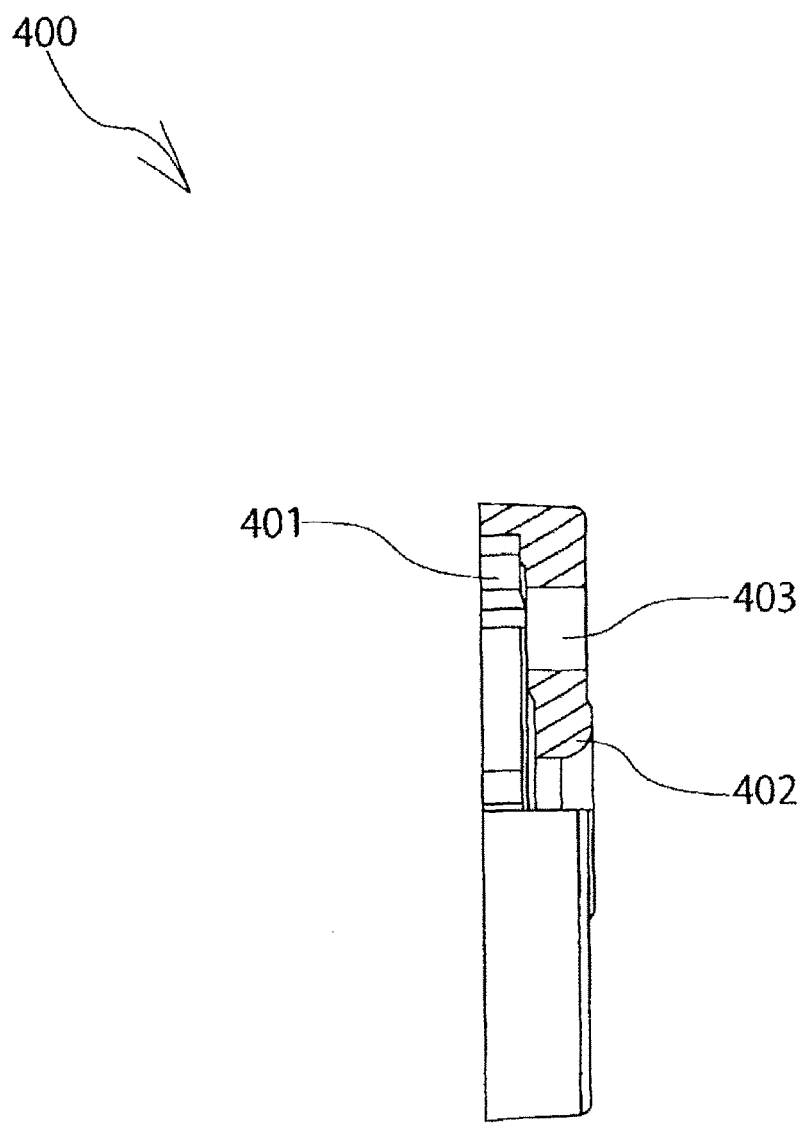
FIG. 42 is a side view in which one half of FIG. 40 is shown in a cross-sectional surface.

As shown in FIGS. 40 to 42, a characteristic of the present embodiment is that in the inner circumferential portion of a ring member 400, there are provided holes 403 in a wall 402 in the thickness direction.

Specifically, as shown in FIGS. 40 to 42, in the inner circumferential portion of the ring member 400, there are provided concave-shaped locking portions 401, and the wall 402 inwardly projecting in the radial direction up to halfway from one end portion in the thickness direction in the ring shape.

In the wall 402, there are provided circular holes 403 passing through in the thickness direction with a plurality of pieces, for example, six pieces in the radial manner.

Incidentally, although a circular form is illustrated as an example as the shape of the holes 403, the shape of the holes 403 is not limited to that, or although the number of the holes 403 is shown as six pieces as an example, the holes 403 may be provided with a single piece, two to five pieces, or seven pieces or above.

Although it is not shown in the figures, an air might be mixed into the housing. At a rotation time of the ring member 400, the air might form a layer of air by covering a surface thereof, so that due to the layer of air, the torque might decline.

At that time, if the holes 403 are formed, at the rotation time of the ring member 400, the air enters into the holes 403 so as to be capable of preventing the surface of the ring member from being covered with the air. Consequently, according to the present embodiment, not only a decline in the torque due to the air can be prevented, but also producing a sound due to the air can be prevented.

Incidentally, all contents of the specifications, claims, drawings, and abstracts of Japanese Patent Applications No. 2010-13287 filed on Jan. 25, 2010 and No. 2010-154029 filed on Jul. 6, 2010 are cited in their entireties herein and are incorporated as a disclosure of the specification of the present invention.

What is claimed is:

1. A damper comprising:
    a housing having an approximately cylindrical shape, and filled with viscous fluid;
    a cap which is a lid of the housing;
    a rotor portion rotatably axially supported inside the housing; and
    blade portions projecting from the rotor portion,
    wherein the blade portions comprise deformation portions expanding a diameter of the blade portions in one rotational direction in response to a resistance received from the viscous fluid and reducing the diameter of the blade portions in the other rotational direction, and
    when the diameter expands, the blade portions engage a ring member provided on an inner circumference of the housing, and drag the ring member.

2. A damper according to claim 1, wherein the housing or the cap includes a braking field, in which a gap in an axial direction of the rotor portion becomes small when the diameter of the blade portions expands.

3. A damper according to claim 1, wherein the blade portions have a spiral shape.

4. A damper according to claim 1, wherein the blade portions include at least two engaging portions engaging the ring member.

5. A damper according to claim 1, wherein an inner circumferential portion of the ring member having locking portions of the ring member includes a wall in a thickness direction.

6. A damper according to claim 5, wherein in the inner circumferential portion of the ring member, the wall in the thickness direction is provided with a hole.

* * * * *